Sept. 27, 1960   H. R. DE VLIEG   2,953,973
MILLING MACHINE
Filed July 2, 1958   13 Sheets-Sheet 1

INVENTOR.
HOWARD R. DeVLIEG
BY
William Frederick Werner
ATTORNEY

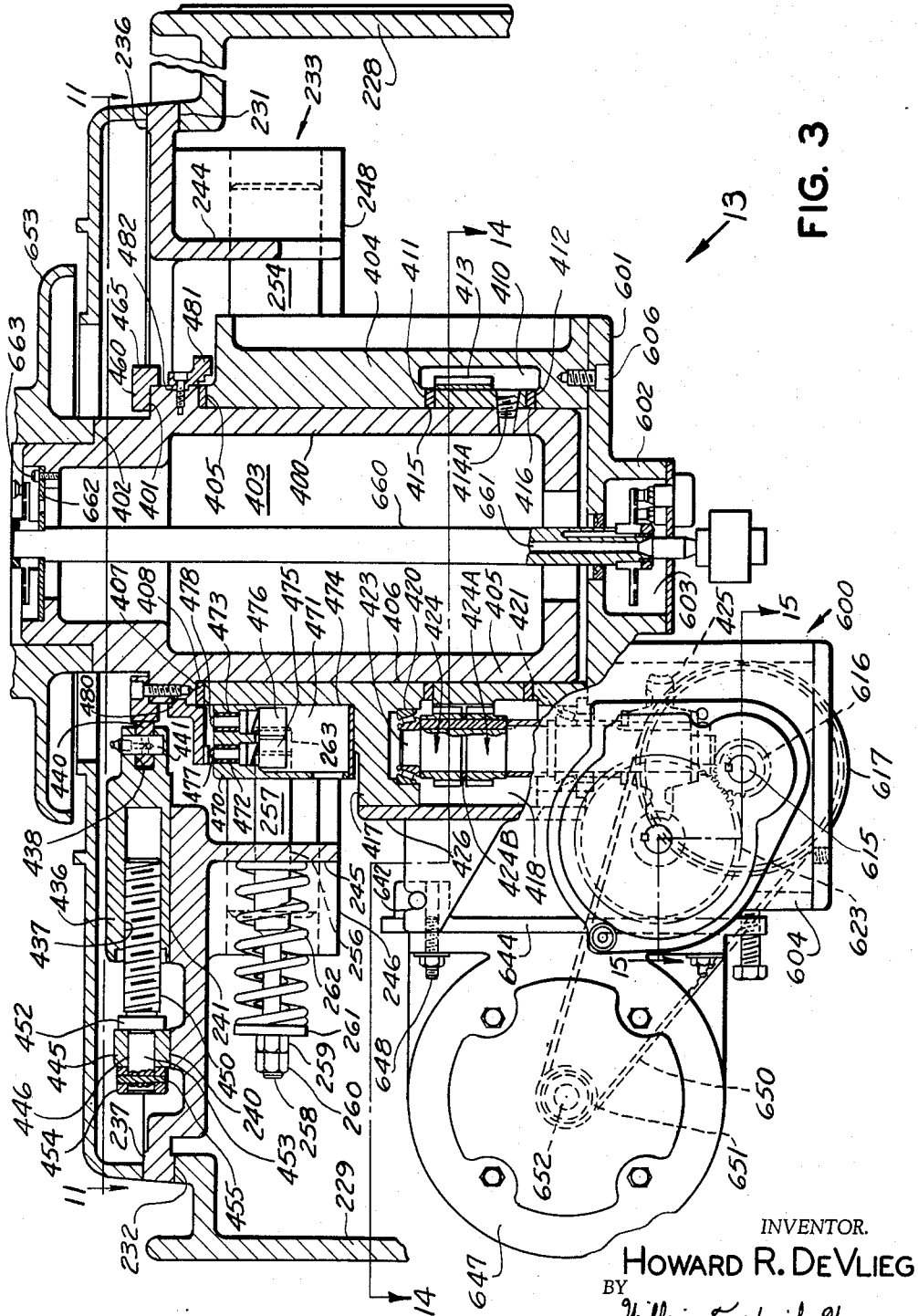

INVENTOR.
HOWARD R. DeVLIEG
BY
William Frederick Werner
ATTORNEY

Sept. 27, 1960 H. R. DE VLIEG 2,953,973
MILLING MACHINE
Filed July 2, 1958 13 Sheets-Sheet 4

INVENTOR.
HOWARD R. DeVLIEG
BY
William Frederick Werner
ATTORNEY

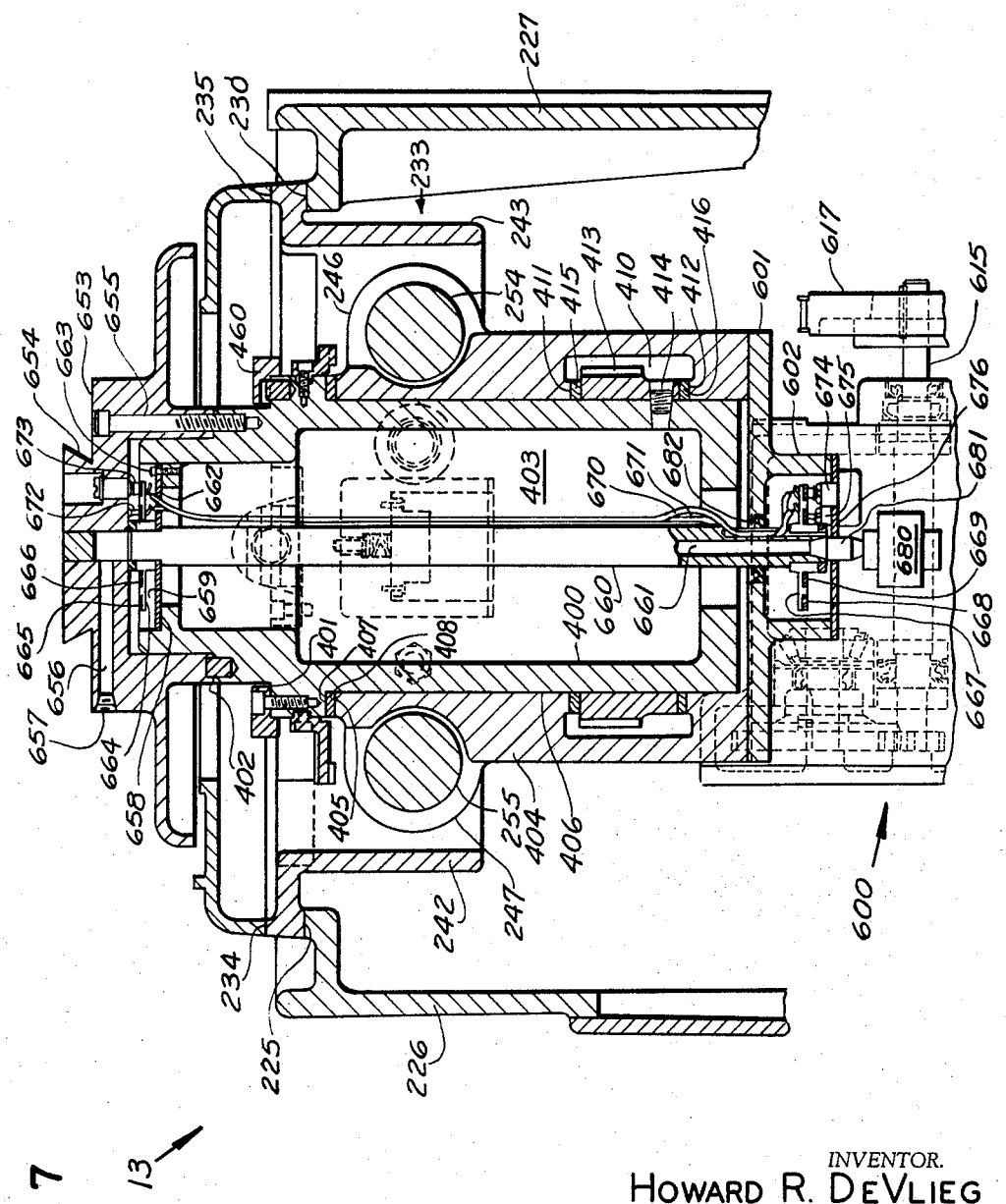

INVENTOR.
HOWARD R. DeVLIEG
BY
William Frederick Werner
ATTORNEY

Sept. 27, 1960 H. R. DE VLIEG 2,953,973
MILLING MACHINE
Filed July 2, 1958 13 Sheets-Sheet 7

INVENTOR.
HOWARD R. DEVLIEG
BY
William Frederick Werner
ATTORNEY

Sept. 27, 1960 H. R. DE VLIEG 2,953,973
MILLING MACHINE
Filed July 2, 1958 13 Sheets-Sheet 8

INVENTOR.
HOWARD R. DE VLIEG
BY
William Frederick Werner
ATTORNEY

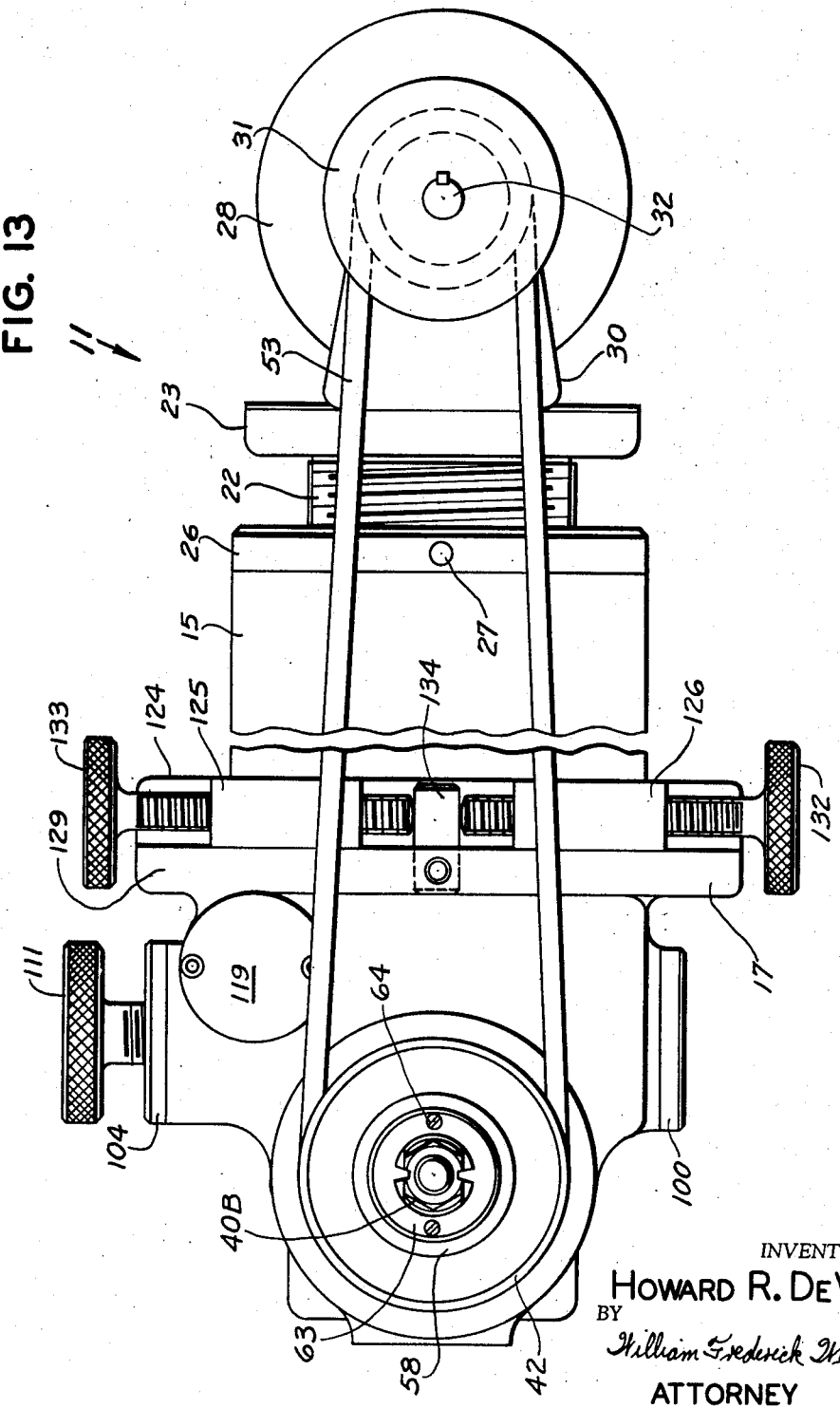

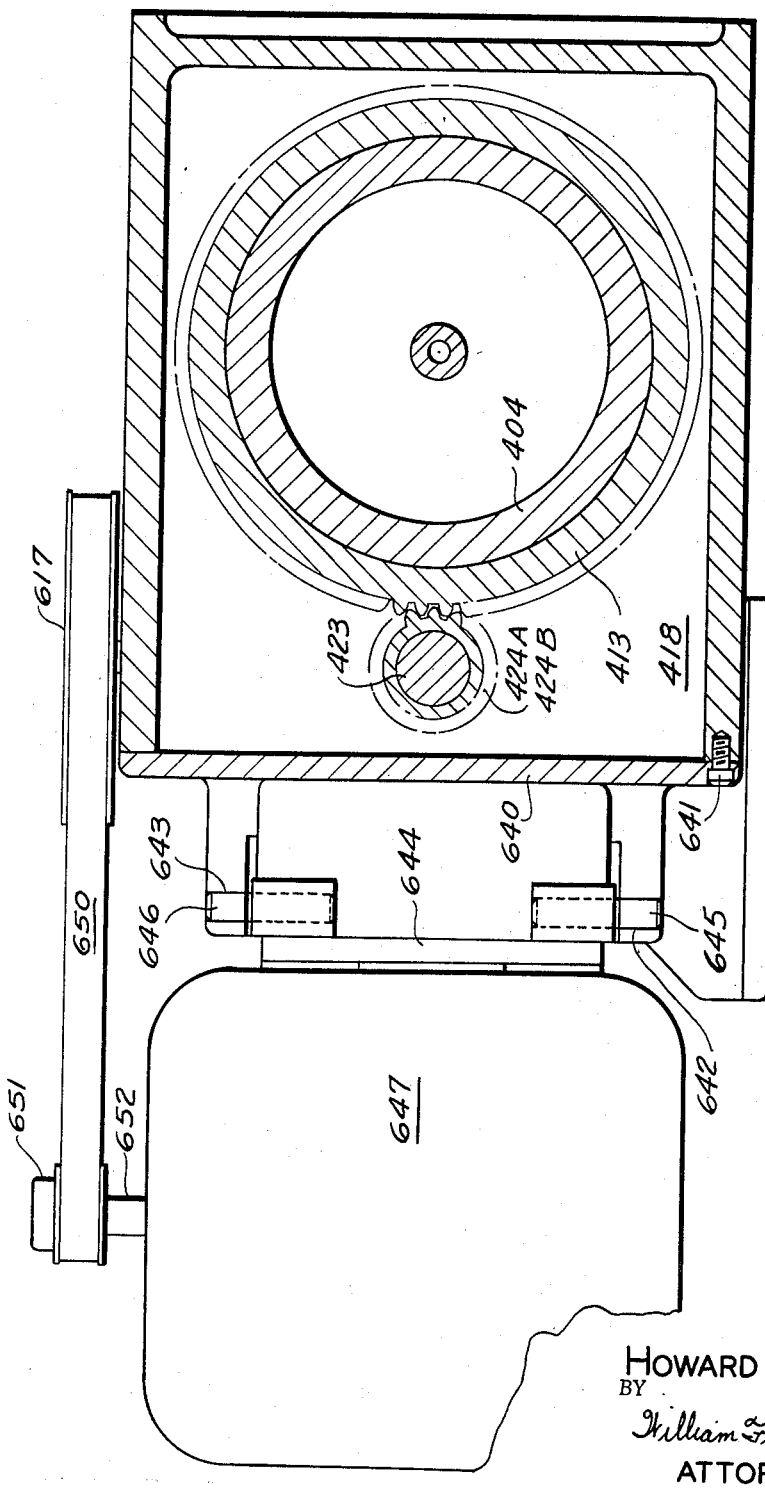

Sept. 27, 1960  H. R. DE VLIEG  2,953,973
MILLING MACHINE
Filed July 2, 1958  13 Sheets-Sheet 13

INVENTOR.
HOWARD R. DE VLIEG
BY
*William Frederick Werner*
ATTORNEY

United States Patent Office 2,953,973
Patented Sept. 27, 1960

2,953,973
MILLING MACHINE

Howard R. De Vlieg, 402 Spring Green Road, Warwick, R.I.

Filed July 2, 1958, Ser. No. 746,253

20 Claims. (Cl. 90—13.4)

This invention relates to milling machines and more particularly to milling machines wherein the cutting spindle rotates in a fixed position and the work piece is presented to the cutter in a contour pattern as determined by a cam.

One of the objects of the present invention is to provide a milling machine with the cutting spindle in fixed position and means to present the work piece to the cutting spindle in a predetermined contour pattern.

Another object of the present invention is to provide a milling machine with simplified cutting means whereby complex cuts requiring multiple movements are made under control of a single cam.

Still another object of the present invention is to provide a milling machine with a construction to produce a higher degree of cutting accuracy, a higher degree of tool life and a wider range of contour variations in a work piece than was heretofore possible.

Another object of the present invention is to provide a milling machine for the profile cutting of high temperature alloy steels which require a positively held accurately positioned cutting tool, with a back and side rake adjustment of great accuracy.

A further object of the present invention is to eliminate tool deflection, cutting chatter, excessive radial tool pressure, drive backlash, prevent the cutting tool from dwelling in a cut and to prevent chip accumulation.

And still a further object of the present invention is to eliminate distortion between the parts of the milling machine which have relative movement while firmly supporting and properly balancing a work piece in profile movement.

Another object of the present invention is to eliminate the tracer in profile milling and consequently the inherent hunting of the tracer for the pattern.

Still another object of the present invention is to provide the high degree of horsepower needed to cut high temperature alloy steels without sacrificing spindle speed, accurate spindle adjustment or profile cutting accuracy.

And still another object of the present invention is to eliminate tool distortion, vibration, out of balance machining and multiple tool set ups.

In the past the same basic mechanical movements were attained by two or more synchronized cams, by stylus tracing templets and by pantograph machines. The multiple movements obtained were limited in scope and accuracy by the compound cams. Stylus tracers were employed to follow and translate the templet pattern to a revolving cutting tool which acted upon a stationary work piece. The present invention overcomes these limitations by utilizing a single cam in place of two or more cams and by holding a revolving cutter in a desired fixed position while moving the work piece in a contour pattern generated by the single cam, thus providing a rigid, simplified and accurate contour control.

In addition, prior art tracers would hunt and dwell to cause the cutting tool to hunt and dwell in a cut. Dwelling resulted in broken cutting tools and hunting resulted in inaccurate profile cuts.

Cutting speeds and feeds are critical in accurate machine tool cutting. Constant cutting speed control is vital to maximum tool performance of profile accuracy and tool life.

The present invention overcomes these deficiencies by eliminating the tracer and its translation of a pattern and by providing constant movement of the work piece. The cylinder carrying the work piece always turns positively in one direction and a pressure means is provided between the cam and cam follower for applying a constant, uniform pressure on the contour edge or face of the cam.

The present invention encompasses three moving parts. A rotating spindle angularly adjustable and fixed in adjusted position during cutting rotation. A rotating cylinder carrying a cam and the work piece. The cylinder is oscillated during the cutting operation under control of the cam. Two fixed guides support the oscillating movement of the cam. All lines of force; the pressure means between cam and cam follower and the oscillation of the cylinder on the slide bars, are in parallel alignment to prevent an angular or twisting thrust from being imparted to the cam, cylinder and work piece holding fixture. The cam is the generated contour of the final form to be cut and is not a form to be translated into a final form to be cut as in prior devices.

Other objects of the present invention will be pointed out in part and become apparent in part in the following specification and claims.

Referring to the drawings in which similar characters of reference indicate corresponding parts in all the figures:

Figure 3 is a vertical cross sectional view taken along line 3—3 of Figure 2.

Figure 7 is a horizontal cross sectional view taken along line 7—7 of Figure 1 and at a ninety degree angle to Figure 3.

Figure 13 is a plan view of Figure 4 with the belt guard removed.

Figure 14 is a horizontal view, partly in cross section, taken along line 14—14 of Figure 3.

Figures 1, 2:
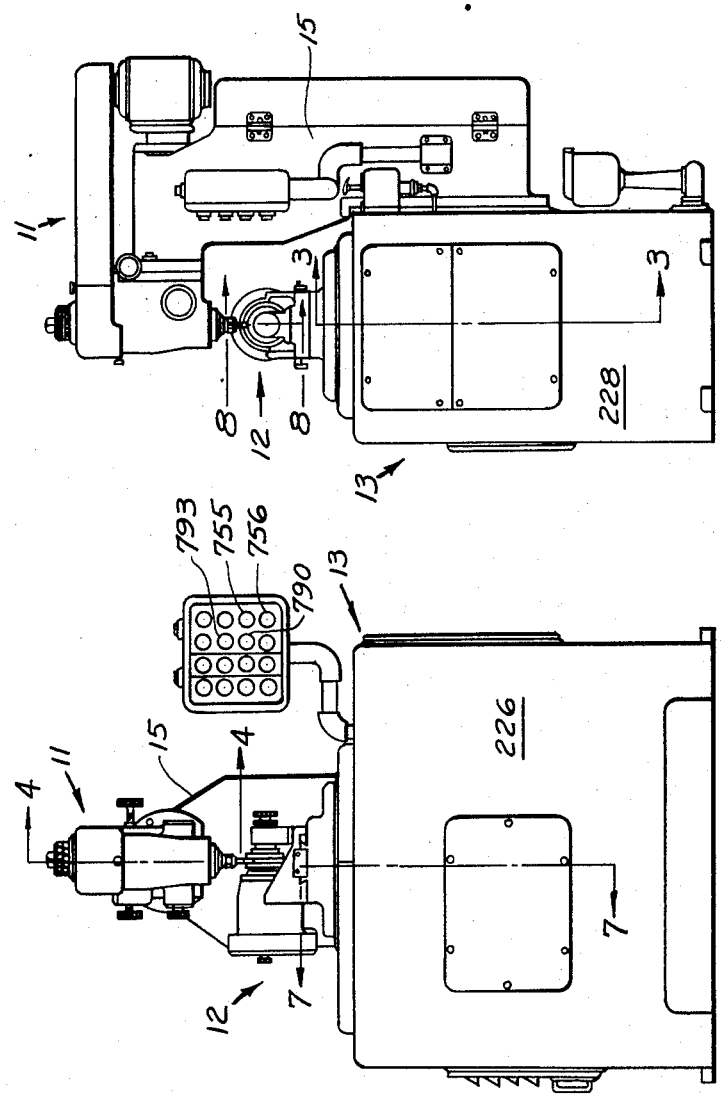
Figure 1 is a front elevational view of the new and improved milling machine.
Figure 2 is a right side elevational view of Figure 1.
Figure 4:
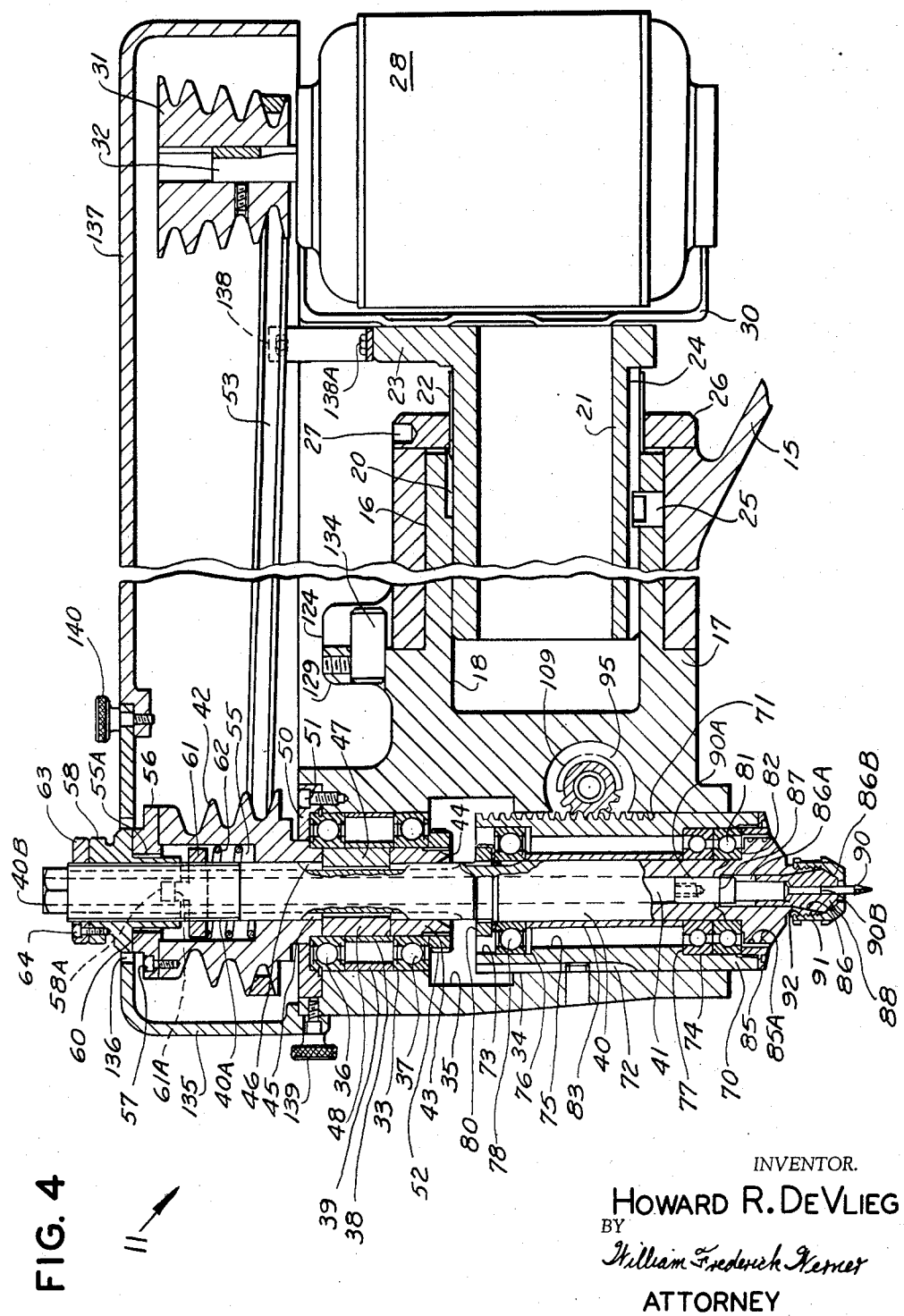
Figure 4 is a vertical cross sectional view through the machine head taken along line 4—4 of Figure 1.
Figures 5, 6:
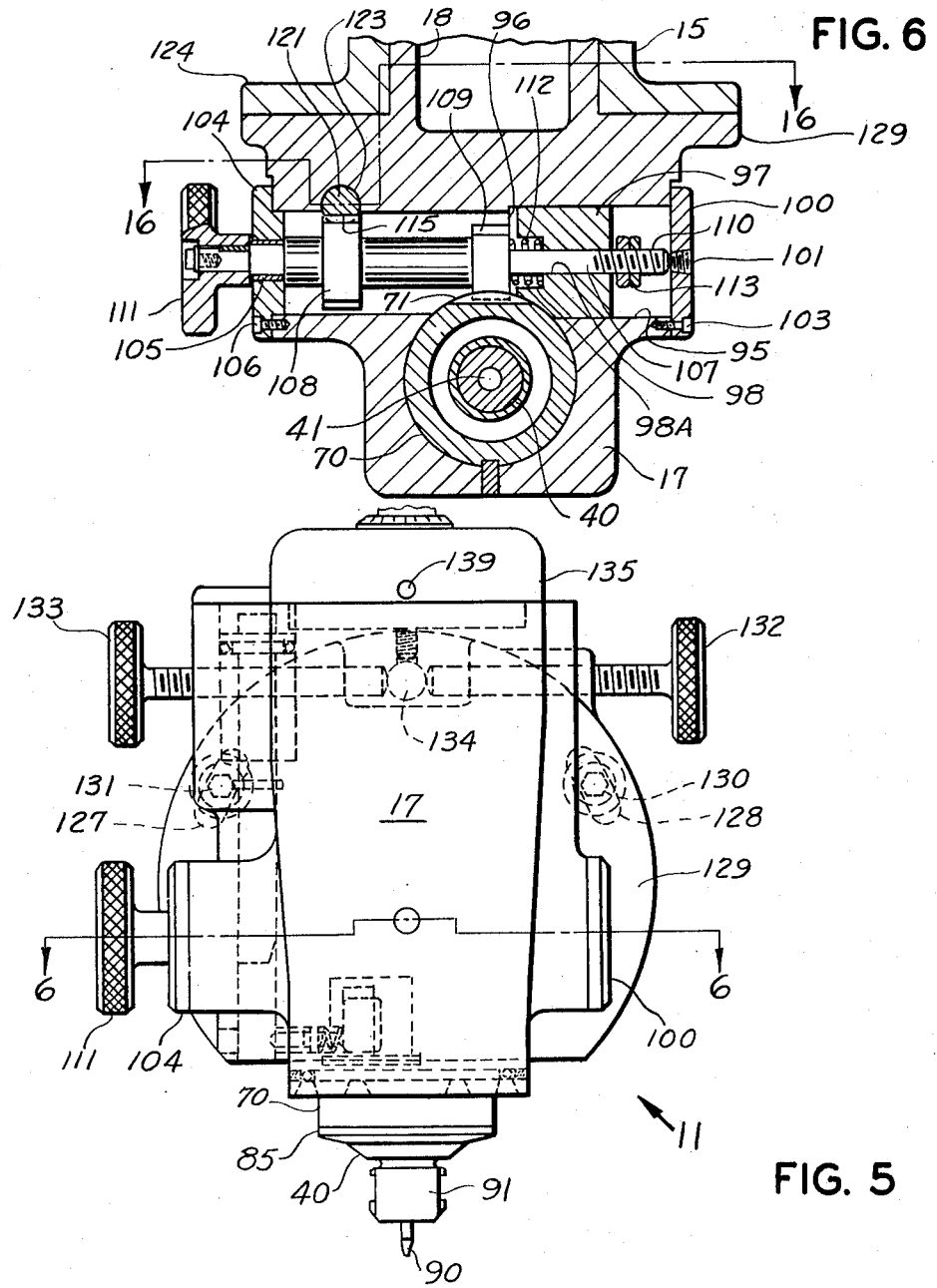
Figure 5 is an enlarged front elevational view of the machine head and is similar to Figure 1.
Figure 6 is a horizontal fragmentary cross sectional view taken along line 6—6 of Figure 5.
Figure 8:
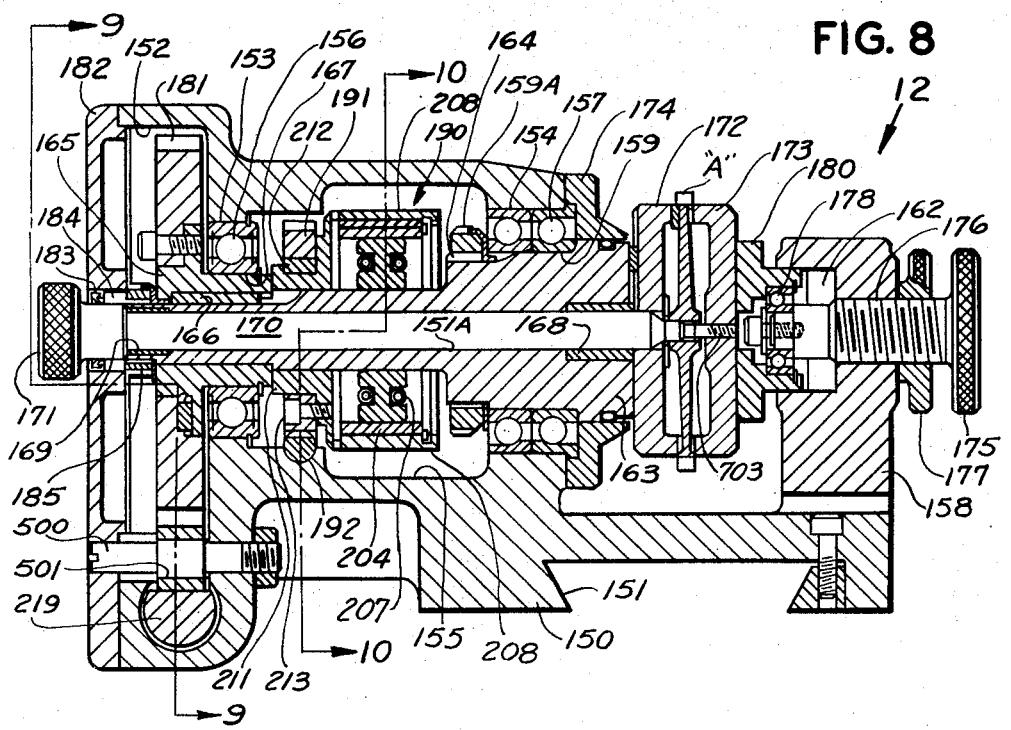
Figure 8 is a vertical cross sectional view taken along line 8—8 of Figure 2 of the machine fixture.
Figure 9:
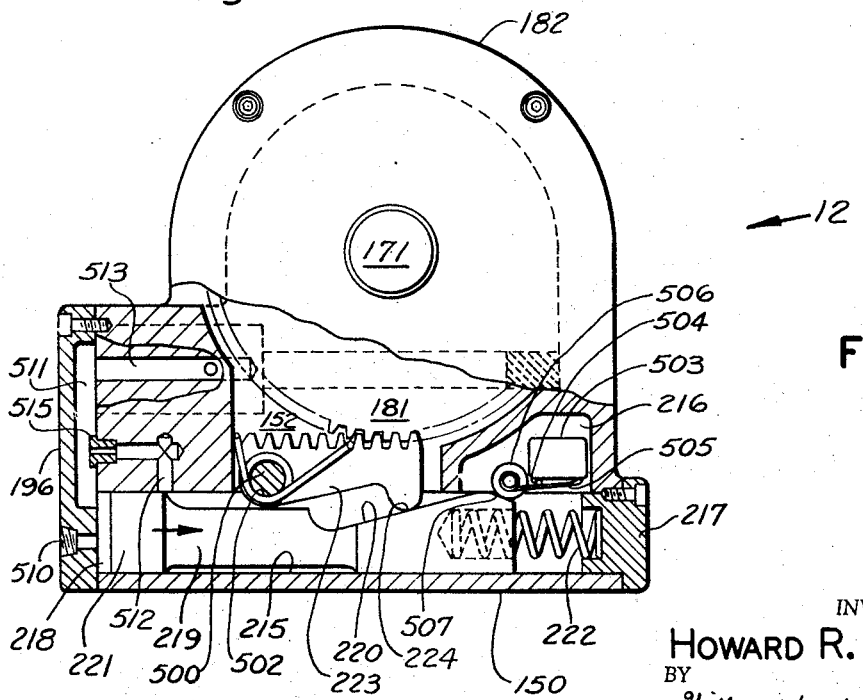
Figure 9 is a partial front elevational view of Figure 8 and partly in section, as indicated by line 9—9 of Figure 8.
Figure 12:
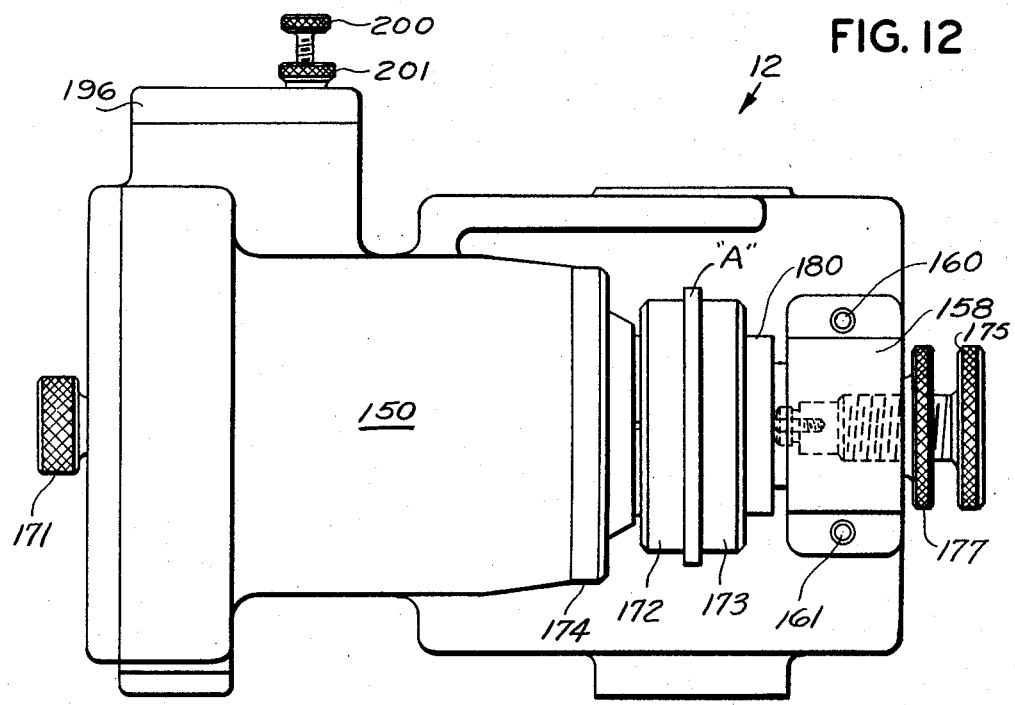
Figure 12 is a plan view of Figure 8.
Figure 10:
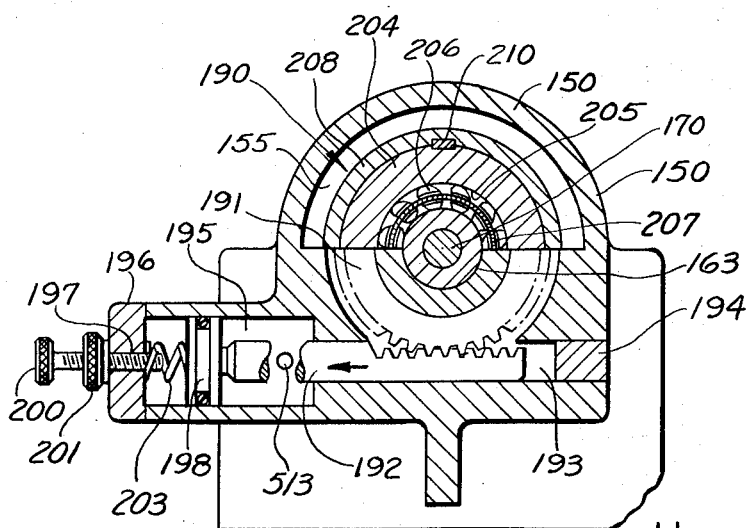
Figure 10 is a vertical sectional view taken along line 10—10 of Figure 8.
Figure 11:
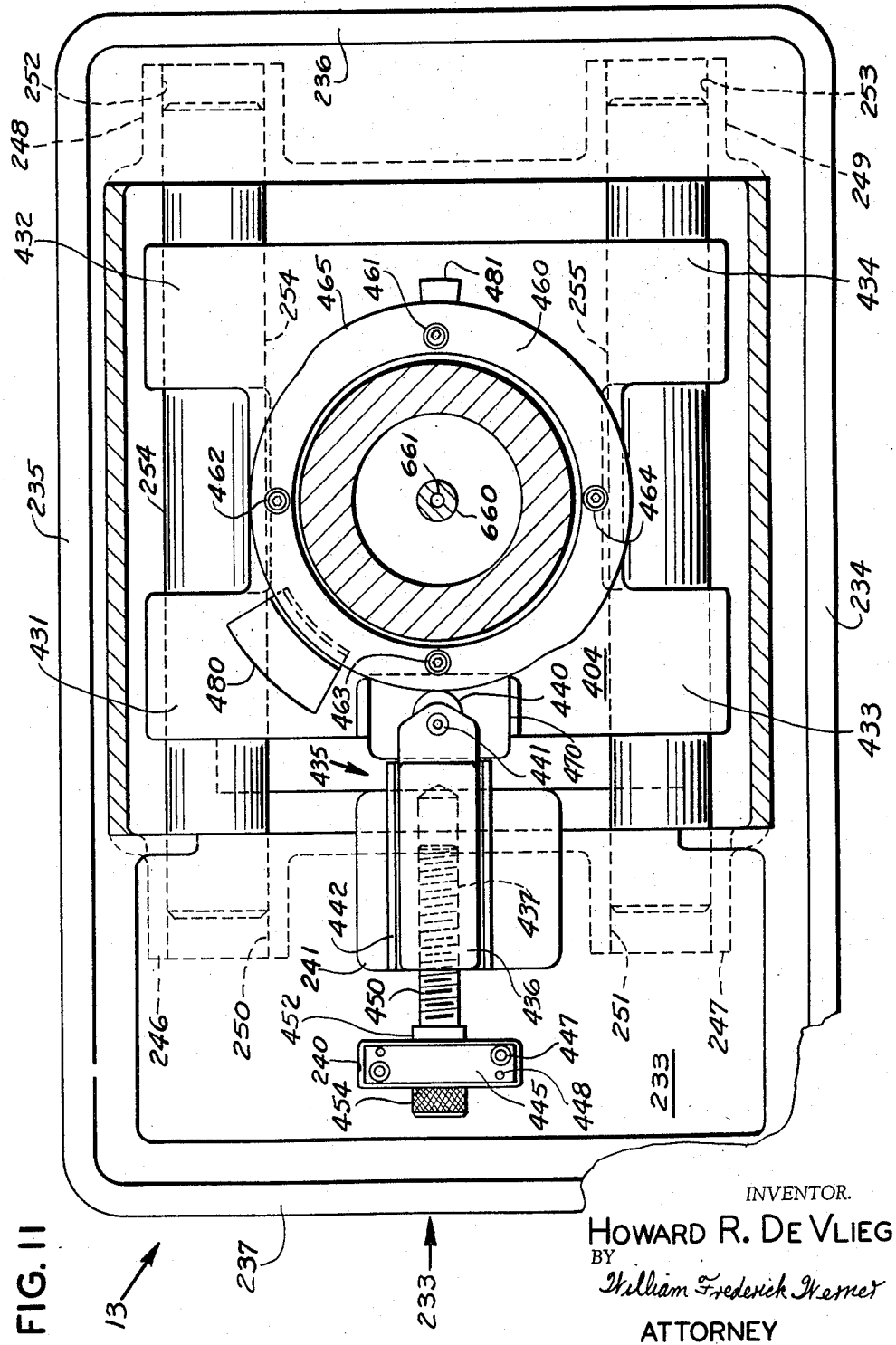
Figure 11 is a horizontal sectional view of the cam and cam follower taken along line 11—11 of Figure 3.
Figure 15:
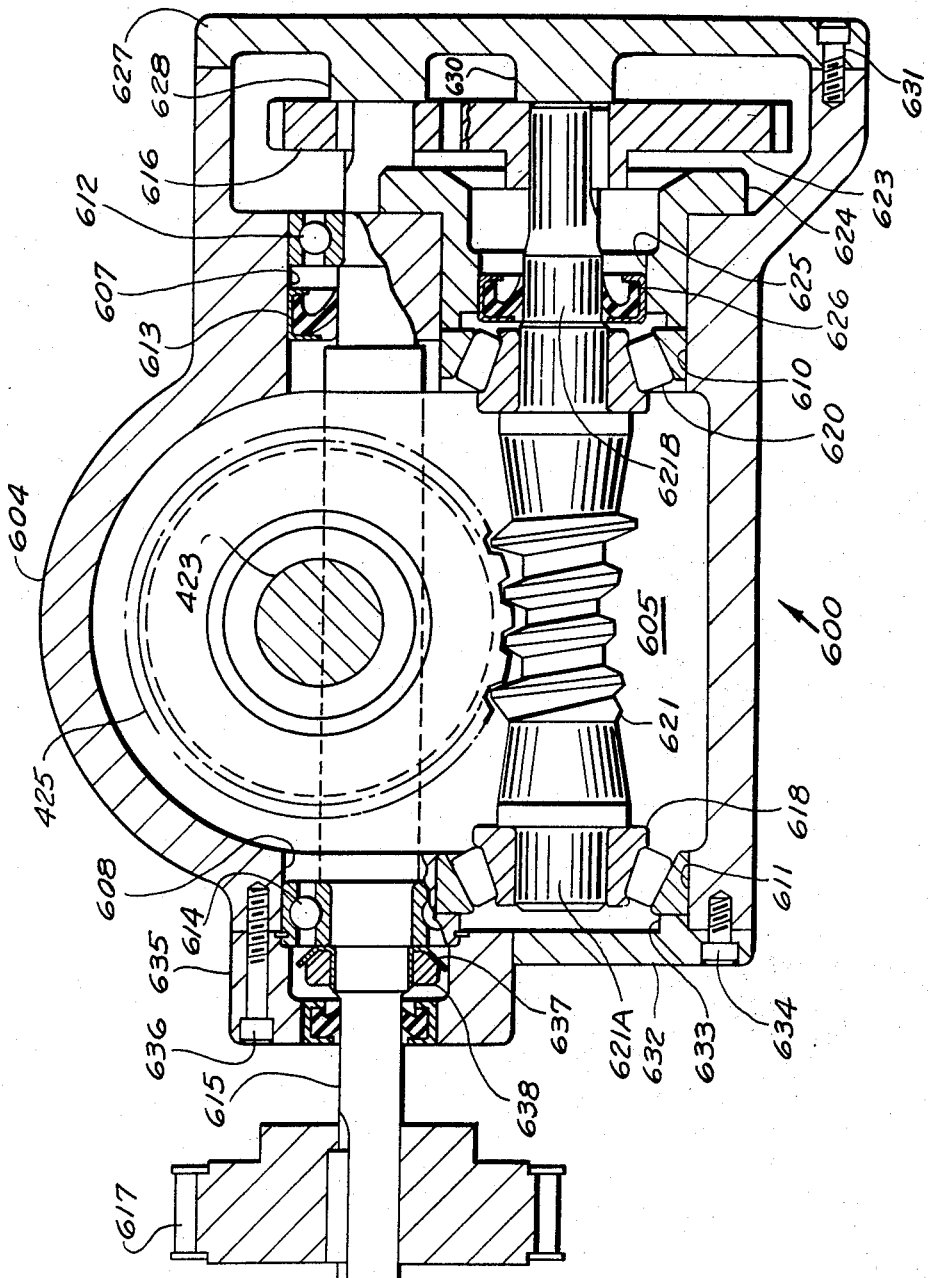
Figure 15 is a horizontal cross sectional view taken along line 15—15 of Figure 3.
Figure 16:
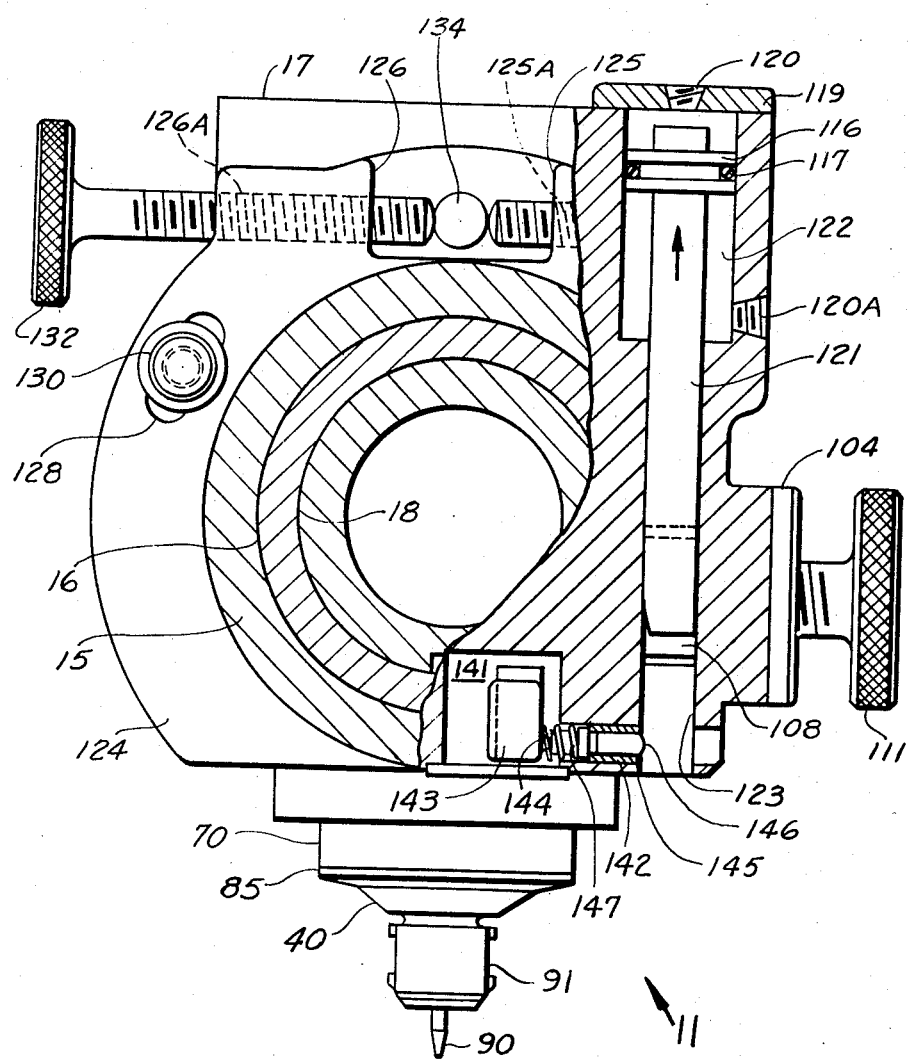
Figure 16 is a vertical cross sectional view taken along line 16—16 of Figure 6.

In proceeding with this invention, reference being made to Figures 1 and 2, the new and improved milling machine will be described as consisting of three sections.

The head section is generally indicated by reference character 11. The fixture section is generally indicated by reference character 12. The base section is generally indicated by reference character 13.

With reference to head section 11, illustrated in Figures 1, 2, 4, 5, 6, 13 and 16; a supporting column 15 is provided with a circular opening 16. A spindle housing 17 is provided with a horizontal passageway 18 and a circular thread clearing orifice 20. Spindle housing 17 is rotatively mounted in circular opening 16 as will presently appear. A motor bracket 21 having a threaded shoulder 22 and a flange 23 is slidably mounted in horizontal passageway 18. To prevent rotation, bracket 21 is provided with a keyway 24 and is keyed to spindle housing 17 through key 25. Threads 22 are partially housed in circular thread clearing orifice 20. A lock nut 26 provided with spanner wrench openings 27 is rotatively mounted on threaded shoulder 22 to limit the sliding movement of motor bracket 21 into horizontal passageway 18. An electric motor 28 is provided with feet 30 which are fastened to flange 23. Thus, providing a horizontally adjustable motor mount in co-operation with bracket 21. A V belt drive pulley 31 is fastened to shaft 32 of electric motor 28.

Spindle housing 17 is provided with a vertical bore consisting of upper bearing seat 33, lower bearing 34 and clearance core 35. An upper 36 and a lower 37 anti-friction bearing is mounted in upper bearing seat 33. Spacing collars 38, 39 are positioned between upper 36 and lower 37 anti-friction bearings. A spindle 40 having a hollow axial core 41 is provided for purposes which will presently appear. A V belt driven pulley 42 having a shank 43 rotatively mounted in anti-friction bearings 36 and 37. The lower end of shank 43 is provided with screw threads 44. Spindle 40 is provided with two key ways 45, 46. Keys 47 and 48 located in shank 43 engage key ways 45, 46 respectively, to drive spindle 40 through V belt driven pulley 42. A retaining collar 50 secured to spindle housing 17 by means of screws 51 and a lock nut 52 engaging screw threads 44 retain and support anti-friction bearings 36, 37 and V belt driven pulley 42 in upper bearing seat 33. A V belt 53 connects V belt drive pulley 31 to V belt driven pulley 42.

Driven pulley 42 is provided with a bore 55. A cap 56 provided axially with a clearance bore 55A is secured to driven pulley 42 by means of screws 57. An adjusting collar 58 is provided with an internal threaded shank 60 which engages threads 40A on the top section of spindle 40. A nut 61 is mounted on spindle 40 through threads 40A. A spring 62 is interposed between the base of bore 55 and nut 61. A lock nut 63 is secured to collar 58 by means of screws 64.

Spring 62 acting upon nut 61 lifts spindle 40 upwards until nut 61 abutts the bottom of cap 56. Thereby limiting the upward stroke of spindle 40. This action of lifting spindle 40 upward lifts adjusting collar 58 upward away from cap 56. Adjusting collar 58 is provided with a key slot 58A. Nut 61 is provided with a tongue 61A which inter-engages with key slot 58A. So that rotation of adjusting collar 58 rotates nut 61 to retain the same relative distance between adjusting collar 58 and nut 61. Adjusting collar 58 abutting cap 56 limits the downward stroke of spindle 40. Spindle 40 on its top end is provided with wrench gripping flats 40B.

A quill 70 provided with rack teeth 71 and a keyway 72 is slidably mounted in lower bearing 34. Axially, quill 70 is provided with an upper bearing seat 73, a lower bearing seat 74 and a clearance core 75 which provides shoulders 76, 77 at intersections of the clearance core with the upper and lower bearing seats 73, 74, respectively. An anti-friction bearing 78 engaging upper bearing seat 73 is retained in position on spindle 40 by means of lock nut 80 which is fixed to spindle 40. An anti-friction bearing 81 engaging lower bearing seat 74, abutts shoulder 77 and a shoulder 82 provided on the lower end of spindle 40. A spacing collar 83 is mounted on spindle 40 between anti-friction bearings 78 and 81.

A lock nut 85 is secured to quill 70 with a lubricating seal 85A interposed between lock nut 85 and spindle 40. Lock nut 80 and lock nut 85 retain anti-friction bearings 78, 81 in quill 70 and support said anti-friction bearings 78, 81 on spindle 40. Spacing collar 83 is held between anti-friction bearings 81 and 78.

Axial hollow core 41 is provided on its lower end with a tapered portion 86 and an enlarged diameter 86A forming a shoulder 87. A split tool collet 88 is located in tapered portion 86 and projects partway into enlarged diameter 86A. Split tool collet 88 is provided with a tapered collet nut seat 86B. A circular cutter stop bar 90A is secured in axial core 41 with an axial enlarged diameter forming a shoulder on cutter stop bar 90A abutting shoulder 87. Circular cutter stop bar 90A provides a positioning surface 90B within split tool collet 88. A tool 90, illustrated as a milling cutter, is located and secured in split collet 88 with the end of tool 90 abutting positioning surface 90B. A collet nut 91 having a taper which cooperates with tapered collet nut seat 86B is rotatively mounted on the end of spindle 40 by means of threads 92. Rotation of collet nut 91 squeezes split collet 88 so as to grip tool 90 and retain tool 90 in spindle 40.

A transverse bore 95 located in spindle housing 17 adjacent and in communication with the vertical bore at lower bearing 34 is provided with a shoulder 96. A collar 97 having an axial passageway 98 is slidingly mounted in bore 95. A cover 100 provided axially with a pipe thread 101 is secured to spindle housing 17 by means of screws 103 to cover one end of transverse bore 95. A second cover 104 provided axially with a bearing 105 is secured to spindle housing 17 by means of screws 106 to cover the other end of transverse bore 95. A shaft 107 fabricated with spaced apart pinions 108, 109 in its medial area is provided with threads 110 on one end and a knob 111 secured to its opposite end. Shaft 107 is rotatively mounted in bearing 105 and in collar 97. Pinion 109 engages rack teeth 71. Pinion 108 engages piston 121. A spring 112 is located in a counterbore 98A located in axial passageway 98 and abutts pinion 109. A pair of lock nuts 113 are located on threads 110.

Spindle housing 17 is provided with a cylinder bore 122 integrally connected with a piston bearing 123 which is in communication with transverse bore 95. Piston 121 slidably mounted in piston bearing 123 is provided with rack teeth 115 which engage the teeth of pinion 108. Piston 121 is provided with a piston head 116 which is grooved to retain an O ring 117. Piston head 116 is slidably mounted in cylinder bore 122. A cover 119 is fixed to spindle housing 17 to cover the end of cylinder bore 122. Cover 119 is provided with a pipe thread 120 adapted to hold an air hose connection (not shown). A second pipe thread connection 120A is provided in spindle housing 17 and is adapted to hold an air hose connection (not shown). Pipe threads 120, 120A are in communication with cylinder bore 122.

Supporting column 15 is provided with a flange 124 having two spaced apart projections 125 and 126 axially having screw threads 125A and 126A. Spindle housing 17 is provided with a mating flange 129. Flange 124 is also provided with two radial slots 127, 128. Bolts 130 and 131 pass through slots 128 and 127 respectively and are threadedly secured in mating flange 129 of spindle housing 17.

Threaded adjusting knobs 132 and 133 are rotatively mounted in the screw threads 126A and 125A of projections 126 and 125 respectively. A pin 134 is fixed in mating flange 129 centrally of projections 125, 126 so that adjusting knobs 132, 133 grip pin 134.

Spindle housing 17 is permitted to rotate in relation to supporting column 15 through the medium of bolts 130, 131 in mating flange 129 which permits flange 129 to rotate relative to mating flange 124 and to the extent limited by the length of radial slots 127, 128. The amount of rotation is calibrated by rotating adjusting knob 132 in one direction and rotating adjusting knob 133 in the opposite direction. Knobs 132, 133 force pin 134 and hence mating flange 129 and spindle housing 17 the desired amount. Spindle housing 17 rotates in circular opening 16 and thereby rotates bracket 21, motor 28, pulley 31 and V belt 53 with it through key 25. Bolts 130, 131 are tightened to secure mating flange 129 and flange 124 together and hold spindle housing in selected angular position.

A belt guard is provided consisting of a front section 135 having a clearance area 136 through which adjusting nut 58 projects and a rear section 137 which rests on spindle housing 17 and is secured to flange 23 through arm 138. Arm 138 secured to flange 23 by means of bolt 138A. Front section 135 also rests on spindle housing 17 and is secured to spindle housing 17 through screw 139. Front section 135 and rear section 137 are fixed together through the medium of screw 140.

A cavity 141 (see Figures 5 and 16) is provided in spindle housing 17 with a bore 142 connecting cavity 141 with piston bearing 123. A micro-switch 143 having a plunger 144 is fixed in cavity 141. A bushing 145 is fixed in bore 142. A switch pin 146 is slidably mounted in bushing 145 with a coil spring 147 interposed between the end of micro-switch 143 and switch pin 146 to cause switch pin 146 to project into piston bearing 123. Switch pin 146 actuates plunger 144 through piston 121 in a manner and for a purpose which will presently appear.

With reference to Figures 1, 2, 8, 9, 10 and 12 wherein is illustrated the fixture section 12 consisting of a fixture body 150 having a dove tail slot 151 and a horizontal axial core comprising a gear housing area 152, a first bearing seat 153 and a second bearing seat 154 with a chamber 155 between said seats. An anti-friction bearing 156 is mounted in first bearing seat 153. A second anti-friction bearing 157 is mounted in second bearing seat 154. A spindle 163 is provided with a seat 159 to accommodate said second anti-friction bearing 157 and threads 164 to accommodate a lock nut 159A for retaining said anti-friction bearing 157 in said seat 159. A spacing hub 165 is secured to spindle 163 by means of key 166 and is provided with a seat 167 to accommodate anti-friction bearing 156. Spindle 163 is therefore rotatively mounted in anti-friction bearings 156, 157.

Axially, spindle 163 is provided with a bore 151A having bushings 168 and 169 secured in opposite ends. A shaft 170 is fixed in bushings 168, 169 and located in bore 151A so as to rotate with spindle 163. A knob 171 is secured to one end of shaft 170. A pair of co-operating work holding jaws 172, 173 are mounted on the other end of shaft 170. A cover 174 is fixed to fixture body 150 and is axially provided with a clearance orifice for spindle 163. An adjusting screw 175 is rotatively mounted in work support bracket 158 by means of threads 176. Shaft 170 is provided on one end with a screw thread 703 which cooperates with a companion screw thread in jaw 173 so that rotation of shaft 170 through knob 171 draws jaw 173 toward jaw 172 to grip the work piece "A."

A work support bracket 158 is fixed to fixture body 150 by means of screws 160, 161 and is provided with an axial bore 162. A lock nut 177 is rotatively mounted on adjusting screw 175. An anti-friction bearing 178 is secured to adjusting screw 175. A pressure pad 180 is secured to anti-friction bearing 178 and is partially retractable into axial bore 162. Pressure pad 180 abuts work holding jaw 173 so as to force jaw 173 toward jaw 172 which abuts the end of spindle 163 to hold a work piece "A" between said jaws.

An index gear 181 is located in gear housing area 152 and is fixed to spacing hub 165. A cover 182 is removably secured to fixture body 150 to cover gear housing area 152. An oil seal 183 is provided between knob 171 and axial clearance orifice 184 in cover 182. A lock nut 185 is secured to spindle 163 to laterally secure spacing hub 165 to spindle 163.

An overriding clutch 190 is provided which may be of the type manufactured by Formsprag Co., 23601 Hoover Rd., Van Dyke, Michigan, catalogue number FS–50–10.

Overriding clutch 190 comprises an outer ring 204 having an inner race way 205. A plurality of sprags 206 held in spaced relation by a garter type spring 207 are mounted for independent rotation in one direction in inner race way 205. In the opposite direction of rotation sprags 206 grip to drive inner raceway 205. Sprags 206 are supported to rotate upon spindle 163. A clutch cup 208 houses ring 204 and is fixed thereto through key 210. Clutch cup 208 provided with a hub 211 upon which pinion 191 is secured by means of a key 212 and screws 213. Clutch cup 208 is mounted for independent rotation upon spindle 163. Pinion 191 engages rack 192.

Fixture body 150 is provided with a bore 193 located transversely to said horizontal axial core and to said chamber 155. Bore 193 is in communication with chamber 155. Bore 193 is provided with a plug 194 in one end and a cylinder area 195 in the opposite end. A cover 196 axially having a threaded area 197 is fixed to fixture body 150 at cylinder area 195.

Rack 192 (see Figure 10) provided with a piston 198 in one end is slidably mounted in bore 193 with piston 198 slidingly engaging cylinder 195. An adjusting screw 200 is rotatively mounted in threaded area 197 with a lock nut 201 rotatively mounted on adjusting screw 200. A spring 203 is located in cylinder 195 between cover 196 and piston 198.

Fixture body 150 (see Figures 8 and 9) is provided with a piston bore 215 which is in communication with gear housing area 152. A chamber 216 located in fixture body 150 is in communication with piston bore 215. A plug 217 is located in one end of piston bore 215 and is fixed to fixture body 150. A cover 196 is fixed to fixture body 150 at the opposite end of piston bore 215 and as previously mentioned also covers cylinder area 195. An air chamber 218 is formed in piston bore 215 between cover 196 and piston head 221.

A piston 219 provided with an inclined surface 220 and a piston head 221 is slidably mounted in piston bore 215. A spring 222 is interposed between plug 217 and the end of piston 219. A rack 223 provided with a shoe 224 is pivotally mounted upon an eccentric diameter 501 of a stud 500 fixed in fixture body 150. Rack 223 engages the teeth of index gear 181 with shoe 224 engaging inclined plane 220. A spring 502 pivotally mounted upon stud 500 has one end engaging the rack 223 and the other end abutting gear housing area 152. Spring 502 yieldingly holds shoe 224 against inclined plane 220.

A micro-switch 503 having a contact button 504 is fixed in chamber 216. An actuating arm 505 having a roll 506 rotatively mounted in one end is fixed to micro-switch 503 on the other end. Piston 219 is provided with a cam surface 507. Roll 506 engages and is actuated by cam surface 507 thereby operating actuating arm 505 and contact button 504.

Cover 196 is provided with a pipe thread 510 to accommodate an air hose connection (not shown). Cover 196 forms an air chamber 511 with fixture body 150. An air passage 512 is provided in fixture body 150 to allow air chamber 511 to communicate with piston bore 215. A second air passage 513 located in fixture body 150 provides communication between air chamber 511 and cylinder 195. An air metering means in the form of a plug 515 provided with a metering orifice is fixed in air passage 512.

In operation air under pressure is admitted to piston bore 215 through pipe thread 510 connection. Said air acting on piston head 221 moves piston 219 against the tension of spring 222 (in the direction of the arrow)

thereby allowing shoe 224 to slide to the low point of inclined surface 220. Thus disengaging the teeth of rack 223 from index gear 181 through the assisting tension of spring 502. After piston head 221 passes beyond air passageway 512 the air then passes through air passageway 512 and through the metering orifice in plug 515 to air chamber 511. The air in chamber 511 passes through second air passage 513 to cylinder 195. Air in cylinder 195 moves piston 192 (in the direction of the arrow) against the tension of spring 203 and thereby rotates pinion 191 and clutch cup 208 to cause sprags 206 to grip inner raceway 205 and spindle 163 to index jaws 172, 173 and work piece A.

When the air supply to the fixture located in pipe threads 510 is shut off, the air pressure is released and spring 203 moves piston 192 in the opposite direction to the arrow to cause rack 192 to rotate pinion 191 and thereby rotating clutch cup 208 and allow sprags 206 to override or slip in rotation against inner raceway 205 and spindle 163.

Spring 222 then moves piston 219 in the opposite direction to the arrow to cause shoe 224 to ride upward on inclined surface 220 to effect engagement of the teeth on rack 223 with the teeth on index gear 181.

With reference to Figures 1, 2, 3, 7, 11, 14 and 15 wherein is illustrated the base section 13 which comprises front wall 226 having a top surface seat 225; rear wall 227 having a top surface seat 230; right side wall 228 having a top surface seat 231 and left side wall 229 having a top surface seat 232.

A hollow cored auxiliary housing generally indicated by reference character 233 comprises seats 234, 235, 236 and 237 with the lower portion of seat 234 engaging and fixed to top surface seat 225; the lower portion of seats 235, 236 and 237 engage and are fixed to top surface seats 230, 231 and 232, respectively.

Auxiliary housing 233 is provided with a boss 240, and a pad 241. Housing 233 has four depending sides, front side 242, rear side 243, right side 244 and left side 245. Right side (see Figure 11) 244 and left side 245 are provided with bosses 246, 247, 248, 249. These bosses are provided with axial bearings 250, 251, 252, 253, respectively. Slide bars 254 and 255 are fixed in bearings 250, 252 and 251, 253 respectively.

Auxiliary housing 233 in left side 245 is provided with a bearing 256. A spring bar 257 is slidably mounted in bearing 256 and is provided with a threaded end 258. A nut 259 and a lock nut 260 are threadedly mounted on threaded end 258. A washer 261 is placed adjacent nut 259. A spring 262 is interposed between washer 261 and left side 245. Spring bar 257 has a threaded end 263 for purposes which will presently appear.

Spring 262 may be replaced by a fluid pressure cylinder, a counter weight or other pressure exerting means provided the pressure exerted by the pressure means is parallel to slide bars 254, 255 which are parallel to each other. The pressure exerted may be either a push or a pull.

A cylinder 400 is provided having a circular cam carrying shoulder 401, an upper circular seat 402, and a lower circular seat 407 and axially having a hollow core 403.

A housing 404 is provided with a circular seat 405 and an axial bearing 406 which accommodates cylinder 400 and circular seat 407, respectively, with a thrust washer 408 interposed between circular seat 405 and circular seat 407 so that cylinder 400 may rotate within housing 404 which determines the axis of rotation of cylinder 400.

Housing 404 is provided with a recess 410 having an upper 411 and lower 412 bearing surface. A gear 413 is fixed to cylinder 400 by means of a drive fit and set screws 414, 414A. Helical gear 413 rotates in recess 410 and is supported in upper 411 and lower 412 bearing surfaces with washers 415 and 416 interposed between the sides of gear 413 and bearing surfaces 411, 412, respectively.

Housing 404 is provided with a projection 417 having a chamber 418. Anti-friction bearings 420 and 421 are located in the upper and lower walls of chamber 418 respectively. A shaft 423 having helical pinion gears 424 and 424A and a worm wheel 425 fixed thereon is rotatively mounted in anti-friction bearings 420 and 421.

A spacing washer 424B mounted on shaft 423 between pinions 424 and 424A eliminates back lash between pinions 424 and 424A by permitting the forward edge of the teeth of one gear to be axially advanced in relation to the teeth of the companion gear.

Housing 404 is provided with four projections 431, 432, 433, 434 axially having bearings which are slidably mounted upon slide bars 243 and 255, respectively.

A cam follower (see Figures 3 and 11) generally indicated by reference character 435 comprises a rectangular housing 436, axially having a threaded bore 437 and provided on its forward end with a slot 438 in which is rotatively mounted a roll 440 by means of a pin 441 secured in housing 436. Pad 241 is provided with a dove tail slot 442 in which is slidably mounted housing 436.

A bracket 445 having an axial bore 446 is fixed to boss 240 by means of screws 447 and dowels 448. A threaded adjusting screw 450 having a shoulder 452 and a stub shaft 453 which is rotatively mounted in bore 446 is rotatively mounted in threaded bore 437. A retaining collar 454 is fixed to stub shaft 453 by means of a pin 455. Collar 454 and shoulder 452 are located on opposite sides of bracket 445 so as to permit screw 450 to rotate in bracket 445. Rotation of screw 450 advances or retracts housing 436 and roll 440 for adjustment purposes.

A cam 460 is mounted upon circular cam carrying shoulder 401 by means of screws 461, 462, 463 and 464. Roll 440 abuts the working edge 465 of cam 460. Spring bar 257 through threaded end 263 is fixed in housing 404 to yieldingly urge working cam surface 465 against roll 440.

A housing 470 provided with a chamber 471 and two vertical bores 472 and 473 is secured to housing 404. Housing 404 has a seat 474 upon which housing 470 rests. Two micro-switches 475 and 476 having plungers 477 and 478, respectively are mounted in chamber 471 with plungers passing through and projecting above bores 472 and 473 respectively.

Trip dogs 480 and 481 are fixed in an annular groove 482 located in cylinder 400. Trip dog 480 actuates plunger 477 and trip dog 481 actuates plunger 478 as cylinder 400 rotates.

A gear housing generally indicated at 600 and consisting of a base plate 601 having a circular projection 602 which is provided with a chamber 603. A gear box housing 604 is integrally formed with base plate 601, and is provided with a chamber 605.

Base plate 601 is secured to housing 404 by means of screws 606. The walls of chamber 605 (see Figure 15) are provided with a lower front right hand bearing seat 607 and a lower rear right hand bearing seat 608. Chamber 605 is also provided with an upper front left hand bearing seat 610 and an upper rear left hand bearing seat 611. An anti-friction bearing 612 and an oil seal 613 are fixed in lower front right hand bearing seat 607. An anti-friction bearing 614 is fixed in lower rear right hand bearing seat 608. A shaft 615 is rotatively mounted in antifriction bearings 612 and 614. A spur pinion gear 616 is fixed on the front end of shaft 615. A drive pulley 617 is fixed to the other end of shaft 615.

An anti-friction bearing 618 is fixed in upper rear left hand bearing seat 611. An anti-friction bearing 620 is fixed in upper front left hand bearing seat 610. A worm gear 621 having shaft ends 621A and 621B is rotatively mounted in anti-friction bearings 618 and 620, respectively. A spur gear 623 is fixed to the shaft end 621B of worm gear 621 and meshes with spur pinion gear 616.

A bearing adapter 624 is fixed in upper front left hand bearing seat 610 and is provided with an oil seal seat 625.

An oil seal 626 is fixed in oil seal seat 625 and surrounds worm gear shaft end 621B.

A cover 627 provided with retaining bosses 628 and 630 which abut the ends of shafts 615 and 621B, respectively, is fixed to gear box housing 604, by means of screws 631.

A cover 632 provided with a bearing retaining boss 633 abutting anti-friction bearing 618 is fixed to gear box housing 604 by means of screws 634.

A second cover 635 provided axially with an oil seal which surrounds shaft 615 is fixed to gear box housing 604 by means of screws 636. A washer 637 and a lock nut 638 secured to shaft 615 is provided to retain anti-friction bearing 614 in position. Worm gear 621 is in drive engagement with worm wheel 425.

A motor plate bracket 640 acting as a cover for chamber 418 is secured to housing 404 by means of screws 641. Motor plate bracket 640 is provided with two U shaped depressions 642 and 643. A motor plate 644 having stud shafts 645 and 646 fixed thereto is pivotally mounted in U shaped depressions 642 and 643, respectively.

An electric motor 647 is secured to motor plate 644 by means of studs 648. A belt 650 connects drive pulley 617 with a motor pulley 651 fixed to shaft 652 of motor 647.

An adapter plate 653 provided with a male dove tail groove 654 which slidably engages female dove tail groove 151 of fixture body 150 is fixed to cylinder 400 by means of bolts 655 and adapter plate carrying shoulder 402. Axially, adapter plate 653 is provided with an air passageway 656 having a pipe connection outlet 657. The wall of hollow core 403 is provided with a flange 658 which creates a chamber 659 in cooperation with the bottom of adapter plate 653.

A shaft 660 having a hollow axial passageway 661 is secured to a supporting disk 662 by means of brazing, soldering, welding etc. Supporting disk 662 is fixed to flange 658 by means of screws 663. An insulated material ring 664 having two electrically conductive rings 665, 666, fixed therein is secured to shaft 660 at its upper end. Similarly, on the lower end of shaft 660 a second insulated material ring 667 having two electrically conductive rings 668, 669 fixed therein is secured thereto.

Two electrically conductive connections 670, 671 are fixed to shaft 660 with one end of each connection 670, 671 engaging rings 668, 669 respectively and the other end of which engages rings 665, 666 respectively. Two fixed contact brushes 672 and 673 are fixed in adapter plate 653 and engage rings 666 and 665 respectively. To fixed contact brushes 674 and 675 are fixed in a cover plate 676 which is secured to the bottom of circular projection 602 enclosing chamber 603.

An air rotary joint 680 is provided having a connection 681 which is fixed in wall of axial passageway 661 of shaft 660. Cover plate 676 is provided axially with a clearance orifice to accommodate connection 681. An oil seal 682 is provided between shaft 660 and base plate 601 with the oil seal fixed in an accommodating clearance orifice in base plate 601.

In operation; a circular solid disk having an axial bore constitutes the work piece "A." The axial bore of work piece "A" is slidably mounted upon the end of shaft 170 with one side of work piece "A" abutting jaw 172. Jaw 172 bears against the end of spindle 163. Jaw 173 is held in position while knob 171 is rotated to cause thread 703 to engage jaw 173 and draw jaw 173 tightly against work piece "A" to clamp or grip work piece "A" between jaws 172, 173. Pressure pad 180 through rotation of adjusting screw 175 is made to bear against jaw 173 to provide stability and firmness to jaws 172, 173 in holding work piece "A." Lock nut 177 secures adjusting screw 175 in selected position.

The number and the spacing of the cuts to be made in the periphery of work piece "A" is determined by index gear 181 which is pre-selected along with a mating rack 223.

Head section 11 is angularly adjustable to work piece "A" as previously described, so that the relation of cutting tool 90 to work piece "A" may be radial, parallel to a radial centerline or angularly positioned to a radial centerline.

Milling cutter 90 is secured in collet 88 as previously described. The depth of the cut to be made in the periphery of work piece "A" is determined by the adjustment of adjusting collar 58 upon threads 40A located on spindle 40 in relation to cap 56 as previously described. Spindle 40 is rotated by electric motor 28 through V belt drive pulley 31, V belt 53 and V belt driven pulley 42.

The contour of the cut to be provided by milling cutter 90 in the periphery of work piece "A" is determined by the working edge 465 of cam 460. Cam edge 465 is a generated contour of the pattern to be cut by cutter 90 in work piece "A" as distinguished from an exact pattern which is traced and then cut by a cutter. Cam 460 is rotated through the following mechanism.

Electric motor 647 (see Figures 3, 7, 14 and 15) rotates shaft 615 through motor pulley 651, belt 650 and drive pulley 617 secured to shaft 615. Cam 460 secured to cylinder 400 is rotated through a train of gears consisting of helical gear 413 fixed to cylinder 400, pinion gears 424, 424A, fixed to shaft 423, and engaging helical gear 413, worm wheel 425 fixed to shaft 423 and worm gear 621 in engagement with worm wheel 425. Pinion gear 616 fixed to shaft 615 engages to drive spur gear 623 fixed to shaft 621B of worm gear 621.

Cam follower 435 (see Figures 3 and 11) adjustably secured in auxiliary housing 233 as previously described bears against working edge 465 of cam 460 through roll 440. The pressure of spring 262 is exerted in parallelism with slide bars 254, 255 to prevent displacement between fixture 12 and spindle 40 through misalignment of cylinder 400, housing 404 and cam 460. Cylinder 400 rotatively secured in housing 404 having projections 431, 432 and 433, 434 which are slidably mounted upon slide bars 254 and 255 respectively, causes housing 404 to oscillate upon slide bars 254, 255 as cylinder 400 rotates cam 460 against stationary cam follower 435.

Figure 17:
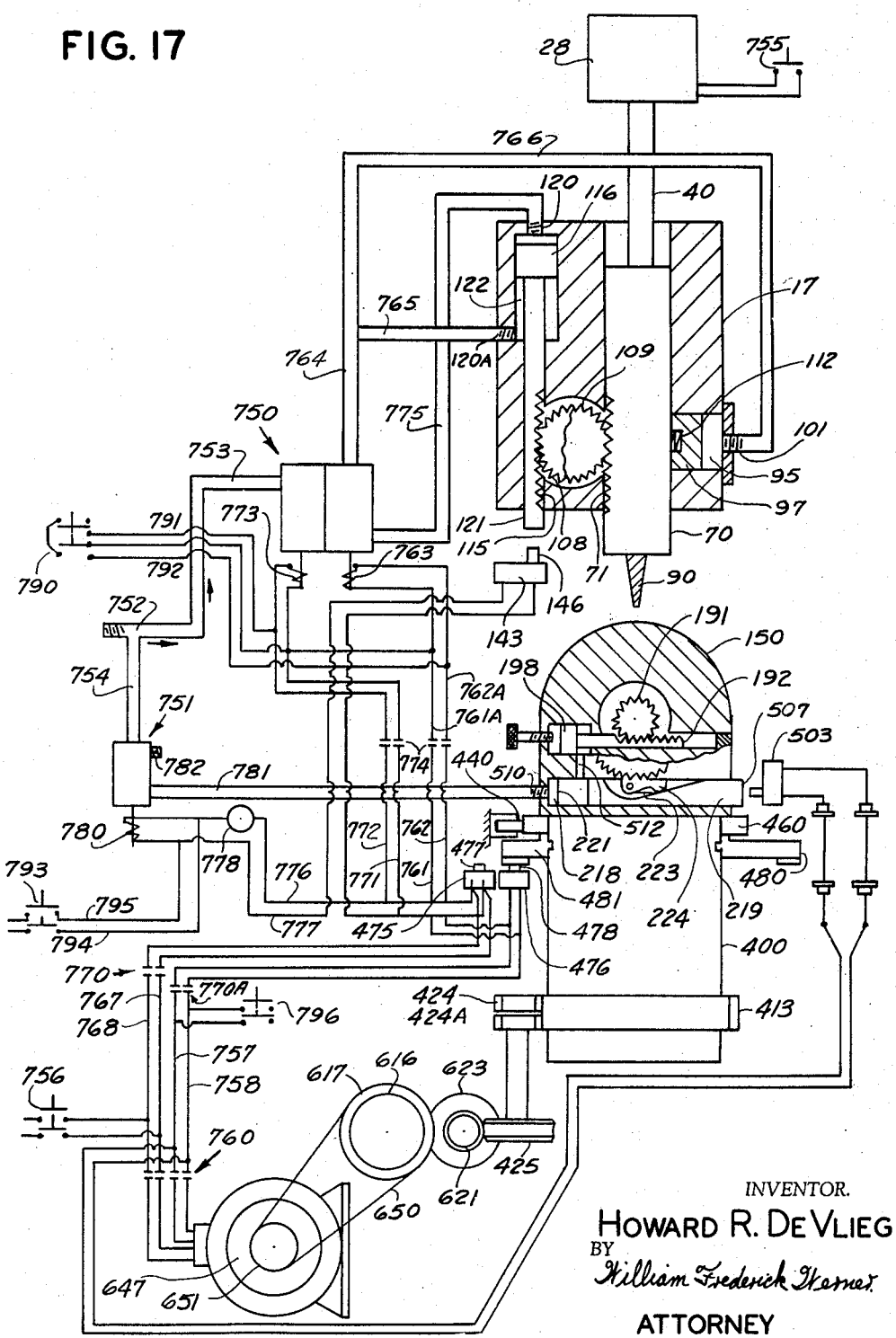
Figure 17 is a schematic and diagrammatic view of the pneumatic system and electrical circuit.

Referring to Figure 17 wherein is illustrated a diagrammatic representation of the electrical and pneumatic means for controlling the machine functions.

Two solenoid air valves generally indicated by reference character 750 and 751 are provided. Valve 750 is a four port two solenoid valve. Valve 751 is a three port single solenoid valve. The pipe threads for the piping connections are illustrated in Figures 6, 7, 9 and 16. A source of air supply enters the system at conduit 752 and through conduit 753 reaches four port two solenoid valve 750 where the air supply is momentarily blocked. The source of air supply from conduit 752 and through conduit 754 reaches two port solenoid valve 751 where the air supply is blocked.

It is to be assumed that spindle 40 is raised or inoperative non-rotating position. The work piece "A" is clamped between jaws 172, 173, in fixture 12. Manual operation of push button 755 causes motor 28 to be energized, thereby rotating spindle 40 and cutting tool 90.

Manual operation of push button 756 causes motor 647 to be energized, thereby rotating cylinder 400 through the gear train previously described. Rotation of cylinder 400 rotates trip dogs 480 and 481 and cam 460.

It is to be assumed that trip dog 481 actuates microswitch 476 thereby initiating three functions. Function one: through electrical conduits 757 and 758, and relay 760, motor 647 is caused to rotate at tool cutting or slow speed. Function two: through electrical conduits 761, 762 and their companion conduits 761A and 762A connected to each other by relay 774, conduits 761, 762 lead to solenoid valve 750 and specifically to solenoid 763 to energize solenoid 763 to actuate valve 750 to permit air from conduit 753 to pass through air conduits 764 and 765 whereby air passing through pipe threads 120A into cylinder bore 122 actuates piston 121 (in the direction of the arrow) through piston head 116 to rotate pinion 108 through rack teeth 115. Rotation of pinion 108 through shaft 107 and pinion 109 moves quill 70 downwardly through rack teeth 71 whereby spindle 40 moves downwardly placing rotating cutting tool 90 in operative or cutting position against work piece "A." Function three: air passing through conduit 764 passes to conduit 766 and pipe threads 101 into transverse bore 95 whereby collar 97 moving against spring 112 bears against the periphery of quill 70, locking quill 70 and therefore spindle 40 and tool 90 in operative or cutting position against the cutting thrust of cutting tool 90. The air supply through conduit 766 into transverse bore 95 is continuous during the tool cutting operation to maintain collar 97 against quill 70 in locked position. This is accomplished by placing a holding relay 774 in the electrical circuit. When trip dog 481 disengages plunger 478 the circuit in conduits 761, 762 would normally be broken, however by providing a holding relay 774 the circuit in electrical conduits 761A and 762A is kept closed so that solenoid 763 remains energized until holding relay 774 is tripped to break the circuit in conduits 761A and 762A.

Continued rotation of cylinder 400 causes trip dog 481 to disengage micro-switch 476 whereby motor 647 remains in tool cutting speed until trip dog 480 engages plunger 477 of micro-switch 475 whereby three functions are initiated. Function one: through electrical conduits 767 and 768, relay 760 is actuated whereby motor 647 is caused to rotate at rapid traverse or fast speed to rotate cylinder 400 and fixture 12 to initial cutting position. This rapid traverse is used for that period of a 360 degree cycle which is not needed for the cutting cycle. The cutting cycle may be a few degrees of rotation or many degrees of rotation up to one full cycle of 360 degrees. Selector switches 770 and 770A are provided in the circuit of conduit 767, 768 and 757, 758 respectively. The manual operation of selector switch 770 determines the direction of rotation of motor 647 in the high speed or rapid traverse speed. The manual operation of selector switch 770A determines the direction of rotation of motor 647 in the low speed or feed rate speed. So, that, motor 647 rotating in one direction for the tool cutting cycle or the rapid traverse cycle may be made to rotate in an opposite direction for the completion of the cycle. This function may be used where the cutting cycle is of short duration. It is therefore quicker to arrive at the initial cutting position by reversing cylinder 400, rather than rotate through a relatively long cycle. This function may also be used in a long cutting cycle under circumstances unimportant to the function of the structure.

Function two: through electrical conduits 771 and 772 leading to solenoid valve 750 and specifically to solenoid 773, solenoid 773 is energized to thereby actuate valve 750.

The instant that trip dog 480 engages plunger 477, holding relay 774 in the circuit of conduit 771, 772, holding relay 774 is actuated to de-energize solenoid 763 and thereby cause valve 750 to shut off air to conduits 764, 765, 766. Collar 97 is moved to unlocked or disengaged position from the periphery of quill 70 under the influence of spring 112.

Actuating valve 750 allows air from conduit 753 to pass through conduit 775 to cylinder bore 122 through pipe threads 120 to actuate piston 121, downwardly, in a direction opposite to the direction to the arrow, thereby rotating pinion 108, through rack teeth 115. Rotating pinion 108 rotates shaft 107, pinion 109 engaging quill 70 through rack teeth 71 to raise spindle 40 and cutting tool 90 upwardly to inoperative position. When piston 121 reaches its lowermost position it actuates plunger 146 of micro-switch 143 for purposes which will presently appear.

Cylinder 400 continues to rotate under the influence of motor 647 so that trip dog 480 disengages plunger 477 thereby opening the circuit in conduits 771, 772. However, holding relay 774 remains energized until actuated by trip dog 481 engaging plunger 478 to close the circuit in conduits 761, 762. Therefore, solenoid 773 remains energized until de-energized by holding relay 774. Air from conduit 753 therefore, continuously passes through valve 750 to conduit 775, cylinder bore 122 and piston head 116 to hold piston 121 in down position in order to hold tool 90 in upward or inoperative position until released by trip dog 481.

The third function is to index the work piece "A." Trip dog 480 engaging plunger 477 on micro-switch 475 closes the circuit of conduits 776, 777 leading to solenoid 780 of solenoid valve 751 and time delay switch 778. Solenoid 780 is energized to allow air from conduit 754 to pass through solenoid valve 751 to conduit 781. Time delay switch 778 energizes solenoid 780 for a predetermined period of time after trip dog 480 disengages plunger 477. Air in conduit 781 passes through threaded pipe connection 510 into chamber 218 acting upon piston head 221 to move piston 219 against the tension of spring 222. Movement of piston 219 causes rack 223 through shoe 224 under the influence of spring 502 to ride downwardly along incline plane 220 to disengage rack 223 from index gear 181. Piston 219 provided with cam surface 507, moving in the direction of the arrow, causes roll 506 to actuate contact button 504 of micro-switch 503 to open the circuit in conduits 757, 758 for purposes which will presently appear.

Movement of piston head 221 exposes air passageway 512 to chamber 218 to allow air from chamber 218 to pass through air passageway 512, through metering orifice in plug 515 into chamber 511. Air then passes through air passage 513 into cylinder 195. Air in cylinder 195 moves piston 192 against the tension of spring 203 until piston 192 abuts adjusting screw 200 and thereby rotates pinion 191 and clutch cup 208 to cause sprags 206 to grip inner raceway 205 and spindle 163 to index jaws 172, 173 and work piece "A."

Time delay switch 778 operating through a cycle breaks the circuit to solenoid 780 thereby actuating solenoid valve 751 to block the air to conduit 781.

Spring 203 moves piston head 198 and rack 192 thereby revolving outer ring 204 to cause the sprags 206 to override spindle 163 and inner raceway 205. Movement of piston head 198 forces the air in cylinder 195 to pass through air passage 513, chamber 511, metering orifice in plug 515, air passageway 512, into chamber 218, conduit 781, solenoid valve 751 to be exhausted to the atmosphere through port 782.

Spring 222 moves piston 219 to block air passageway 512 and to cause shoe 224 to ride upwardly along inclined plane 220 against the tension of spring 502 so that rack 223 engages index gear 181 to lock spindle 163 and therefore work piece "A" in indexed position.

The indexing structure just described provides an extremely high degree of indexing accuracy because the teeth in index gear 181 mesh with the teeth in rack 223 which are located and held in fixed position through stud 500.

Two safety features in the form of micro-switches are provided to insure proper functioning of the indexing mechanism.

In order to prevent the indexing mechanism in fixture 12 from indexing when cutter 90 is in operative or work engaging position, micro-switch 143 is provided to insure that spindle 40 is in raised or inoperative position before the indexing cycle is initiated.

Micro-switch 143 having plunger 146 is located in a position so that the end of piston 121 engages and actuates plunger 146 to close the electrical circuit to solenoid 780, thereby allowing air to pass from source of supply conduit 752, through conduit 754, to valve 751 and through valve 751 to conduit 781 to actuate piston 219 as previously described. Micro-switch 143 when not actuated by piston 121 causes circuit to solenoid 780 to be open or broken so that valve 751 blocks air from conduit 754 to conduit 781.

In order to insure proper indexing through the engagement of the teeth of rack 223 with the teeth of indexing gear 181, micro-switch 503 is provided. Micro-switch 503 has a roll 506 which is actuated by cam surface 507.

Micro-switch 503 is in an electrical circuit consisting of conduits 757, 758, motor 647, and relay 760. Micro-switch 503 is normally closed.

At the start of the cycle of movement of piston 219 in the direction of the arrow, the high point of cam surface 507 actuates roll 506 to cause micro-switch 503 to open or break the circuit to relay 760. Motor 647 will continue to rotate until it completes its immediate cycle. In the interim piston 219 will have completed its movement in the direction of the arrow and will have started back and returned to initial starting position. In that event the high point of cam surface 507 will have disengaged roll 506, thereby actuating micro-switch 503 into circuit closed position. Relay 760 will be actuated to permit motor 647 to start another cycle.

In the event piston 219, on the return stroke, in a direction opposite to the direction of the arrow was unable to continue its return stroke, the high point of cam surface 507 will continue to engage roll 506 to cause micro-switch 503 to remain in open position. The teeth of rack 223 failing to properly engage the teeth of index gear 181 will have wedged rack 223 through shoe 224 between the teeth of index gear 181 and inclined surface 220. Thereby stopping movement of piston 219. Roll 506 in engagement with the high point of cam surface 507 will cause micro-switch 503 to remain in open position, whereby the relay 760 remains in open position preventing motor 647 from starting a new cycle. Manual adjustment properly engages the teeth of rack 223 with the teeth of index gear 181. Roll 506 is removed from the high point of cam surface 507. The cycle continues as previously described.

A spindle selector switch 790 is provided in an electrical circuit consisting of conduits 791, 792 which connect to conduits 761A and 762A, respectively, to move spindle 40 into and out of tool cutting position through solenoid valve 750 as previously described. Selector switch 790 is provided to permit spindle 40 to be operated independently of the automatic cycling of the rest of the mechanism.

An index push button 793 is provided in an electrical circuit consisting of conduits 794, 795 which connect to conduits 776, 777, respectively, to operate solenoid valve 751 whereby air is passed from conduit 754 to 781 initiating movement of piston 219 and the rest of the indexing function independent of the automatic cycling of the machine.

A feed rate button 796 is provided in the electrical circuit consisting of conduits 757, 758 whereby relay 760 is independently actuated to close the circuit to motor 647 in the feed rate speed cycle.

Having shown and described preferred embodiments of the present invention, by way of example, it should be realized that structural changes could be made and other examples given without departing from either the spirit or scope of this invention.

What I claim is:

1. In a machine tool, a fixture for holding a work piece, a rotatable spindle, means to reciprocate said spindle toward and away from said work piece, a rotatable cylinder having a cycle of 360 degrees, said fixture secured to said cylinder, a cam fixed to said cylinder, a stationary follower engaging said cam, and means to slidably support said cylinder, whereby rotation of said cam against said stationary cam follower causes said cam and said fixture to oscillate on said slidable support during the rotation of said cylinder through a cycle of 360 degrees to cause said fixture holding said work piece to move in the contour pattern of said cam relative to said spindle.

2. In a machine tool, a fixture, means in said fixture for holding a work piece, a rotatable spindle angularly adjustable to said fixture, means to reciprocate said spindle toward and away from said fixture, a rotatable cylinder having a cycle of 360 degrees, a cam and said fixture secured to said cylinder, a stationary follower engaging said cam, means to slidably support said cylinder and means to rotate said cylinder through a cycle of 360 degrees, whereby rotation of said cam against said stationary cam follower causes said cam, fixture and cylinder to oscillate on said slidable support during the rotation of said cylinder through a cycle of 360 degrees to move said fixture in the contour pattern of said cam relative to said spindle.

3. In a machine tool, a fixture, means in said fixture for holding and indexing a work piece, a spindle angularly adjustable to said work piece, means to rotate said spindle, means to reciprocate said spindle toward and away from said work piece in timed automatic sequence to said indexing means, a cylinder, a cam and said fixture secured to said cylinder, a stationary follower engaging said cam, means to support said cylinder, and means to rotate said cylinder through a cycle of 360 degrees in automatic timed relation to said spindle reciprocating toward and away from said work piece and to said indexing means whereby said cylinder, fixture and work piece move in the contour pattern of said cam relative to said rotating spindle during the rotation of said cylinder through a cycle of 360 degrees.

4. In a machine tool, a fixture, means in said fixture for holding and indexing a work piece, a spindle housing, a spindle, provided with a cutting tool, rotatively mounted in said spindle housing, means to rotate said spindle and cutting tool, means in said spindle housing to reciprocate said spindle and cutting tool toward and away from said work piece a predetermined distance, a housing, an auxiliary housing provided with parallel slide bars, means to slidably mount said housing upon said slide bars, a cylinder rotatively mounted in said housing, means to rotate said cylinder, a cam and said fixture secured to said cylinder, a stationary cam follower secured to said auxiliary housing in operative engagement with said cam whereby rotation of said cam oscillates said cylinder, housing and fixture upon said slide bars in relation to said rotating cutting tool.

5. In a machine tool, a fixture for holding a work piece, a rotatable spindle, means to reciprocate said spindle toward and away from said work piece, a rotatable cylinder, said fixture secured to said cylinder, a cam fixed to said cylinder, a stationary follower engaging said cam, a third means to support said cylinder, a fourth means to yieldingly urge said cam against said stationary follower, a fifth means to rotate said cylinder through a cycle of 360 degrees whereby rotation of said cam against said stationary cam follower causes said cam and said fixture to oscillate on said third means to cause said fixture holding said work piece to move in a contour pattern generated by said cam, relative to said spindle.

6. In a machine tool, a fixture, a first means in said fixture for holding a work piece, a second means for pneumatically indexing a work piece, a spindle housing, a spindle rotatively mounted in said spindle housing, a cutting tool, a third means to secure said cutting tool to said spindle, a fourth means to rotate said spindle, a fifth means in said spindle housing to pneumatically reciprocate said spindle and cutting tool into and out of cutting position against said work piece, a sixth means in cooperation with said second means for locking said spindle and cutter in position against said work piece to oppose the cutting thrust of said cutter, a housing, an auxiliary housing, two parallel bars fixed in said auxiliary housing, a seventh means to slidably mount said housing upon said two parallel bars, a cylinder rotatively mounted in said housing, an eighth means to rotate said cylinder, a cam and said fixture secured to said cylinder, a stationary cam follower secured to said auxiliary housing, a ninth means for yieldingly urging said housing and cam toward said stationary cam follower with said cam engaging said cam follower and said housing sliding on said two parallel bars whereby rotation of said cylinder and cam oscillates said cylinder, said housing and said fixture upon said two parallel bars and against the urging of said ninth means, in relation to said rotating cutting tool locked in cutting position.

7. In a machine tool, a fixture, a work piece, a first means to secure said work piece in said fixture, a second means for pneumatically indexing the work piece, a spindle housing, a spindle provided with a cutting tool rotatively mounted in said spindle housing, a third means to rotate said spindle in said spindle housing, a fourth means to angularly position said spindle in said spindle housing, a fifth means in said spindle housing to reciprocate said spindle and cutting tool into and out of cutting position against said work piece, a sixth means in cooperation with said second means for locking said spindle and cutter in position against said work piece to oppose the cutting thrust of said rotating cutter against said work piece, a housing, an auxiliary housing, two parallel bars fixed in said auxiliary housing, a seventh means to slidably mount said housing upon said two parallel bars, a cylinder rotatively mounted in said housing, an eighth means to positively and firmly rotate said cylinder in one direction, said fixture secured to said cylinder, said cam secured to said cylinder, a stationary cam follower secured to said auxiliary housing, a ninth means for yieldingly urging said cam against said stationary cam follower and for slidingly urging said housing along said two parallel bars whereby positive rotation of said cylinder and cam, oscillates said cylinder, fixture and work piece, through said housing and against the urging of said ninth means in a contour pattern generated by said cam to present said work piece in a contour pattern to said rotating cutting tool locked in cutting position.

8. In a machine tool, a housing, an auxiliary housing, a cylinder mounted in said housing, means to positively and uniformly rotate said cylinder in one direction within said housing, a fixture for holding a work piece secured to said cylinder, a cam having a profile face fixed to said cylinder, a stationary cam follower fixed to said auxiliary housing and engaging the profile face of said cam, pressure means between said stationary cam follower and said profile face whereby said stationary cam follower engages said profile face with a constant and uniform pressure, two guides fixed in said auxiliary housing, means to support said housing and cylinder on said two guides whereby rotation of said cylinder causes said housing, cylinder and fixture to oscillate on said two guides in the pattern generated by said profile face.

9. In a machine tool, a housing, an auxiliary housing, a cylinder rotatively mounted in said housing, means to positively and uniformly rotate said cylinder in one direction within said housing, a fixture for holding a work piece secured to said cylinder, a cam having a profile face fixed to said cylinder, a stationary cam follower fixed to said auxiliary housing and engaging the profile face of said cam, a stud secured in said housing, a coil spring mounted upon said stud to yieldingly urge said profile face against said stationary cam follower, two parallel guide bars secured in said auxiliary housing, bearings in said housing slidably mounted upon said two parallel guide bars, said stud and said coil spring being in parallel relation with said two parallel guide bars to yieldingly urge said profile face against said stationary cam follower in a direction parallel to said two parallel guide bars, rotation of said cylinder causes said housing, cylinder and fixture to slide upon said two parallel guide bars.

10. In a machine tool, a housing, an auxiliary housing, a cylinder mounted in said housing, a helical gear secured to said cylinder, a drive shaft, a first helical pinion secured to said drive shaft and engaging said helical gear, a second helical pinion secured to said drive shaft and engaging said helical gear, the teeth of said first helical pinion being slightly advanced ahead of the teeth of said second helical pinion to remove back lash between said first and second helical pinions and said helical gear, a spacing washer between said first and said second helical pinions, an electrical motor, a gear train, said electrical motor driving said drive shaft, first and second helical pinions, and helical gear through said gear train to rotate said cylinder in one direction, a cam, having a peripheral contour, fixed to said cylinder, a stationary cam follower fixed to said auxiliary housing and engaging the peripheral contour of said cam, resilient means urging said peripheral contour against said stationary cam follower, two parallel guide bars secured in said auxiliary housing, bearings provided in said housing slidably engaging said two parallel guide bars, said resilient means urging said peripheral contour against said stationary cam follower in a direction parallel to and mid-way between said two parallel guide bars, rotation of said cylinder moves said housing and cylinder back and forth along said two parallel guide bars in accordance with the peripheral contour of said cam.

11. In a machine tool, a housing, an auxiliary housing, a cylinder mounted for rotation in said housing, a gear secured to said cylinder, a drive shaft, a pinion secured to said drive shaft engaging said gear, a two speed electrical motor, a gear train, said two speed electrical motor driving said drive shaft, said pinion and said gear through said gear train to rotate said cylinder, a cam, having a predetermined contour, fixed to said cylinder, a stationary cam follower fixed to said auxiliary housing and engaging said contour, resilient means urging said contour against said stationary cam follower, two parallel guide bars secured in said auxiliary housing, bearings, provided in said housing, slidably engaging said two parallel guide bars, said resilient means urging said contour against said stationary cam follower in a direction parallel to and mid-way between said two parallel guide bars, rotation of said cylinder moves said housing and cylinder back and forth along said two parallel guide bars in accordance with said contour, an electrical circuit, a source of electrical energy to said electrical circuit, said two speed electrical motor connected to said electrical circuit, a relay in said circuit between said source of electrical energy and said two speed electrical motor, two micro-switches located side by side in radial position and fixed in said housing, two dogs fixed to said cylinder in radial position to engage and disengage said two micro-switches in timed relation with the rotation of said cylinder, said micro-switches connected to said electrical circuit leading to said relay to alternately actuate said relay and alternately connect said source of electrical energy to one or the other of said two speeds of said electrical motor to change the speed of rotation of said cylinder.

12. In a machine tool, a housing, an auxiliary housing, a cylinder mounted for rotation in said housing, a gear train operatively connected to said cylinder, a multiple speed electrical motor operatively connected to said gear train to rotate said cylinder, a cam, having a generated contour, secured to said cylinder, a stationary cam follower secured to said auxiliary housing and operatively engaging said contour, resilient means urging said contour against said stationary cam follower, two parallel guide bars secured in said auxiliary housing, bearings located in opposite sides of said housing, said bearings slidably engaging said two parallel guide bars, said resilient means urging said contour against said stationary cam follower in a direction parallel to and midway between said two parallel guide bars, rotation of said cylinder moves said housing and cylinder back and forth along said parallel guide bars through said bearings in accordance with said contour, an electrical circuit, a source of electrical energy to said electrical circuit, said multiple speed electrical motor connected to said electrical circuit, a relay in said electrical circuit between said source of electrical energy and said multiple speed electrical motor, a multiple number of micro-switches radially aligned in and secured to said housing, a multiple number of dogs radially aligned in and secured to said cylinder with one dog for each of said multiple number of micro-switches for engagement of one dog with its companion switch one time in each revolution of said cylinder, said multiple number of micro-switches electrically connected to said relay to actuate said relay and change the speed of said multiple speed electrical motor, whereby the speed of rotation of said cylinder is altered.

13. In a machine tool, a fixture for holding a work piece, a rotatable spindle provided with a cutting tool, pneumatic means to reciprocate said spindle and cutting tool toward and away from said work piece, said pneumatic means locking said spindle and therefore said tool in tool cutting position against said work piece to prevent deflection of said cutter from said work piece through the thrust of the cutting action, a rotatable cylinder having a cycle of 360 degrees, said fixture secured to said cylinder, a cam provided with a contour pattern, fixed to said cylinder, a stationary cam follower engaging said contour pattern, resilient means yieldingly urging said contour pattern against said cam follower and means to slidably support said cylinder, whereby rotation of said cam against said stationary cam follower causes said cylinder and said fixture holding a work piece, to oscillate on said slidable support to cause said fixture holding said work piece to move said work piece in the contour pattern of said cam against said rotating cutting tool locked in cutting position.

14. A machine tool consisting of an auxiliary housing provided with a vertical axial cavity, two horizontal guide bars fixed in said auxiliary housing and located in opposite sides of said cavity, a housing having two bearings in alignment on one side and two additional bearings in alignment on the opposite side, a vertical axial bore in said housing, said first mentioned two bearings slidably engaging one of said two horizontal guide bars, said two additional bearings slidably engaging the other of said two horizontal guide bars, a cylinder rotatively mounted in said vertical axial bore, a cam provided with a fixture, a work piece secured in said fixture, said fixture secured to the top of said cylinder, a working surface secured to said cylinder, a stationary cam follower fixed in said auxiliary housing and operatively engaging said working surface, a horizontal resilient means interposed between said auxiliary housing and said housing in parallel alignment and midway between said two horizontal guide bars to yieldingly hold said working surface against said stationary cam follower, a spindle housing fixed to said auxiliary housing and projecting above said cylinder, a vertical spindle provided with a cutting tool rotatively mounted in said spindle housing, means to vertically reciprocate said cutting tool toward and away from said work piece whereby rotation of said cylinder oscillates said housing on said two horizontal guide bars in accordance with said working surface to present said work piece to said rotating cutting tool in a rotating path and in a pattern directly determined by said working surface.

15. A machine tool consisting of an auxiliary housing provided with a vertical axial cavity, two parallel horizontal guide bars fixed in said auxiliary housing and located in opposite sides of said cavity, a housing having two bearings in alignment on one side and two additional bearings in alignment on the opposite side, a vertical axial bore in said housing, said first mentioned two bearings slidably engaging one of said two horizontal guide bars, said two additional bearings slidably engaging the other of said two horizontal guide bars, a cylinder rotatively mounted in said vertical axial bore, a cam, provided with a working surface generating a pattern, secured to said cylinder, a fixture, a work piece secured in said fixture, said fixture secured to the top surface of said cylinder, a stationary cam follower fixed in said auxiliary housing and operatively engaging said working surface, a horizontal resilient means interposed between said auxiliary housing and said housing in parallel alignment and midway between said two horizontal guide bars to yieldingly hold said working surface against said stationary cam follower, a spindle housing fixed to said auxiliary housing and projecting above said fixture and work piece, a quill having rack teeth slidably mounted for up and down movement in said spindle housing, a spindle provided with a cutting tool rotatively mounted on one end in said spindle housing and on the other end in said quill and fixed in said quill to move up and down with said quill, a transverse bore in said spindle housing, a collar having an axial passageway slidably mounted in said transverse bore abutting said quill, a cover provided with an axial bearing fixed to said spindle housing over one end of said transverse bore, a shaft provided with two spaced apart pinions rotatively mounted on one end in said axial passageway and on the other end in said axial bearing, spring means interposed between one of said pinions and said collar, a second cover having an axial air supply fitting fixed to said spindle housing covering an end of said transverse bore, an air chamber in said transverse bore between said second cover and the end of said collar, one of said pinions in rotating drive engagement with said rack teeth, a cylinder bore in said spindle housing transversely to and in communication with said transverse bore, a piston provided with rack teeth slidably mounted in said cylinder bore with said last mentioned rack teeth in drive engagement with said second piston, a cover having an axial air supply fitting fixed to said spindle housing and covering said cylinder bore to form an air chamber between the end of said piston and said last mentioned cover whereby pressurized air entering said last mentioned air chamber through said air supply fitting moves said piston, the rack teeth on said piston, said pinion, said shaft and the other pinion and rack teeth to move said quill and said spindle toward and away from said fixture and work piece.

16. A claim as defined in claim 15 being further characterized in that; pressurized air entering said first mentioned air chamber moves said collar against said spring means to engage said quill to lock said quill and said spindle in desired position.

17. In a machine tool, a fixture, mechanical means in said fixture for holding and indexing a work piece, a rotatable spindle, mechanical means to reciprocate said spindle toward and away from said fixture, a cylinder, said fixture secured to said cylinder, mechanical means to rotate said cylinder through a cycle of 360 degrees, mechanically operated means secured to said cylinder to translate a path of movement for said cylinder during the rotation of said cylinder, hydraulic means actuating said mechanical means to index said fixture and to rotate said spindle and said cylinder and to control in timed sequence the hydraulic means indexing said fixture and reciprocating said spindle toward and away from said fixture.

18. In a machine tool, a fixture, mechanical means in said fixture for holding a work, piece, mechanical means including a hydraulic operated piston for indexing said fixture, a rotatable spindle, mechanical means including a hydraulic operated piston for moving said spindle toward and away from said fixture, a cylinder, said fixture secured to said cylinder, mechanical means to rotate said cylinder 360 degrees, mechanical means secured to said cylinder to effect control of a path of movement of said cylinder during the rotation of said cylinder through a cycle of 360 degrees, hydraulic means actuating both said hydraulic operated pistons, an electrical circuit having a first electrical means to rotate said spindle and to rotate the mechanical means to rotate said cylinder, a second electrical means in said circuit controlling in timed sequence the hydraulic means actuating said hydraulic pistons for indexing said fixture and for moving said spindle and a third electrical means in said electrical circuit operated by said first mentioned hydraulic operated piston to insure the proper sequence of operations of said second electrical means for indexing said fixture and a fourth electrical means in said electrical circuit operated by said second mentioned hydraulic operated piston to insure the proper sequence of operations of said second electrical means for moving said spindle toward and away from said fixture.

19. In a machine tool, a fixture, mechanical means in said fixture for holding a work piece, mechanical means including a hydraulically operated piston for indexing said fixture, a spindle provided with a cutting tool, mechanical means including a hydraulically operated piston for moving said spindle toward and away from said work piece, a cylinder, said fixture secured to said cylinder, mechanical means to rotate said cylinder, a cam fixed to said cylinder, a stationary cam follower, resilient means yieldingly urging said cam against said stationary cam follower, stationary parallel slide bars, said cylinder slidingly mounted upon said slide bars, hydraulic means actuating said piston indexing said fixture in the work performing direction, resilient means opposing said hydraulic means, said hydraulic means actuating said piston for moving said spindle in both directions toward and away from said work piece, an electrical circuit, a first motor in said electrical circuit for rotating said spindle, a second motor having multiple speeds connected to said electrical circuit to rotate said mechanical means to rotate said cylinder to move said fixture holding the work piece in a path directly generated by said cam on said rotating cylinder, a first solenoid valve, a second solenoid valve, an electrical timing unit, united in said electrical circuit, controlling in timed sequence the hydraulic means actuating said hydraulic pistons for indexing said fixture and for moving said spindle, a first micro-switch in said electrical circuit operated by said first mentioned hydraulic piston to insure the proper sequence of indexing, a second micro-switch in said electrical circuit operated by said second mentioned hydraulically operated piston to insure the proper movement of said spindle toward and away from said work piece, a first and a second trip dog secured to said cylinder, a first and second electrical switch and a relay united in said electrical circuit whereby rotation of said cylinder carries said first and said second trip dogs into and out of engagement with said first and second electrical switches, respectively, to actuate said relay and thereby select one of the multiple speeds of said second motor to effect the speed of rotation of said cylinder.

20. In a machine tool, a fixture, mechanical means in said fixture for holding a work piece, mechanical means including an overriding clutch and a hydraulic operated piston for indexing said fixture holding a work piece, a spindle having a cutting tool, mechanical means including a hydraulic operated piston for moving said spindle toward and away from said fixture holding a work piece and said cutting tool into and out of cutting position, and mechanical means hydraulically operated and controlled for locking said spindle and cutting tool in cutting position, a cylinder, means to rotatively and slidably support said cylinder, said fixture holding a work piece secured to said cylinder, mechanical means to rotate said cylinder, a cam secured to said cylinder, a stationary cam follower, resilient means yieldingly holding said cam and said cylinder in operative engagement with said stationary cam follower whereby rotation of said cylinder moves said fixture holding a work piece through a contour pattern generated by said cam relative to said spindle, hydraulic means actuating both said hydraulic operated pistons, an electrical circuit, an electric motor in said circuit to rotate said spindle and cutting tool, a second electrical motor in said electrical circuit to rotate the mechanical means to rotate said cylinder and fixture holding a work piece, an electrical timer in said circuit, a first solenoid valve in said electrical circuit under control of said electrical timer for actuating said hydraulic piston for indexing the fixture holding a work piece, a second solenoid valve in said electrical circuit under control of said electrical timer for actuating said hydraulic piston for moving said spindle and said cutting tool toward and away from said fixture holding a work piece and for locking said spindle and cutting tool in cutting position, and means to energize said electrical circuit.

References Cited in the file of this patent

UNITED STATES PATENTS

| | | |
|---|---|---|
| 414,174 | Trask | Oct. 29, 1889 |
| 1,971,299 | Fickett et al. | Aug. 21, 1934 |
| 2,484,885 | Hassman et al. | Oct. 18, 1949 |
| 2,519,653 | Haywood | Aug. 22, 1950 |
| 2,660,930 | De Vlieg et al. | Dec. 1, 1953 |
| 2,812,695 | Gunderson | Nov. 12, 1957 |
| 2,844,074 | Meyer | July 22, 1958 |